United States Patent
Jia et al.

(10) Patent No.: US 12,464,012 B2
(45) Date of Patent: *Nov. 4, 2025

(54) COBALT STRIKE BEACON HTTPS C2 HEURISTIC DETECTION

(71) Applicant: Palo Alto Networks, Inc., Santa Clara, CA (US)

(72) Inventors: Yanhui Jia, San Jose, CA (US); Shengming Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 278 days.

This patent is subject to a terminal disclaimer.

(21) Appl. No.: 17/877,815

(22) Filed: Jul. 29, 2022

(65) Prior Publication Data

US 2024/0039952 A1 Feb. 1, 2024

(51) Int. Cl.
*H04L 9/40* (2022.01)

(52) U.S. Cl.
CPC ........ *H04L 63/145* (2013.01); *H04L 63/0236* (2013.01); *H04L 63/1416* (2013.01)

(58) Field of Classification Search
CPC ............... H04L 63/145; H04L 63/0236; H04L 63/1416; H04L 63/1425
See application file for complete search history.

(56) References Cited

U.S. PATENT DOCUMENTS

| | | | | |
|---|---|---|---|---|
| 8,578,493 | B1* | 11/2013 | Cowan | G06F 21/554 709/224 |
| 10,715,413 | B2* | 7/2020 | Greene | H04L 43/106 |
| 11,296,967 | B1 | 4/2022 | Rothstein | |
| 11,936,545 | B1* | 3/2024 | Miskovic | H04L 43/0894 |
| 2005/0210294 | A1 | 9/2005 | Amit | |
| 2014/0136834 | A1 | 5/2014 | Sherkin | |
| 2015/0007312 | A1* | 1/2015 | Pidathala | H04L 63/1433 726/22 |

(Continued)

FOREIGN PATENT DOCUMENTS

| | | |
|---|---|---|
| CN | 111903107 | 11/2020 |
| CN | 114282223 A * | 4/2022 |

OTHER PUBLICATIONS

Kumar, Ratnesh, and Kalyani Mali. "A Novel Approach to Edge Detection and Performance Measure . . . " Journal of Image Processing & Pattern Recognition Progress 8.1: 31-38. (Year: 2021).*

(Continued)

*Primary Examiner* — Alexander Lagor
*Assistant Examiner* — Rupali Dhakad
(74) *Attorney, Agent, or Firm* — Van Pelt, Yi & James LLP

(57) ABSTRACT

Techniques for Cobalt Strike Beacon HTTPS C2 heuristic detection are disclosed. In some embodiments, a system/process/computer program product for Cobalt Strike Beacon HTTPS C2 heuristic detection includes monitoring HyperText Transfer Protocol Secure (HTTPS) network traffic at a firewall; prefiltering the monitored HTTPS network traffic at the firewall to select a subset of the HTTPS network traffic to forward to a cloud security service; determining whether the subset of the HTTPS network traffic is associated with Cobalt Strike Beacon HTTPS C2 traffic activity based on a plurality of heuristics; and performing an action in response to detecting the Cobalt Strike Beacon HTTPS C2 traffic activity.

20 Claims, 21 Drawing Sheets

(56) References Cited

U.S. PATENT DOCUMENTS

| | | | |
|---|---|---|---|
| 2016/0149792 A1 | 5/2016 | Wang | |
| 2016/0156644 A1 | 6/2016 | Wang | |
| 2016/0315961 A1 | 10/2016 | Duer | |
| 2017/0187736 A1* | 6/2017 | Fehrman | H04W 12/08 |
| 2017/0264626 A1* | 9/2017 | Xu | H04L 63/1425 |
| 2017/0359220 A1* | 12/2017 | Weith | H04L 63/20 |
| 2019/0253389 A1 | 8/2019 | Verma | |
| 2022/0070223 A1 | 3/2022 | Deng | |

OTHER PUBLICATIONS

Nick Mavis, edited by Joe Marshall and Jon Munshaw, The Art and Science of Detecting Cobalt Strike, Sep. 21, 2020 (Sep. 21, 2020), Retrieved from the Internet: URL: https://www.infopoint-security.de/media/Talos_Cobalt_Strike.pdf.

Van Der Eijk et al., Analysis of Cobalt Strike Network Traffic Obfuscation in C2 Communication, Jul. 3, 2020 (Jul. 3, 2020), Retrieved from the Internet: URL: https://rp.os3.nl/2019-2020/p29/presentation.pdf.

Van Der Eijk et al., Detecting Cobalt Strike Beacons in NetFlow Data, Jul. 3, 2020 (Jul. 3, 2020), XP093085975, Retrieved from the Internet: URL: https://rp.os3.nl/2019-2020/p29/report.pdf.

Author Unknown, Statistics How To, Bowley Skewness: Definition, Formula, Alternate Formula, Jul. 19, 2022.

Author Unknown, WhatIsMyBrowser.com, Latest user agents for Web Browsers &Operating Systems, Jul. 19, 2022.

Cobalt Strike, Software for Adversary Simulations and Red Team Operations, Jul. 25, 2022.

Fuentes et al., Modern Ransomware's Double, Extortion Tactics and How to Protect Enterprises Against Them, 2021, pp. 1-96.

Karantzas et al., An Empirical Assessment of Endpoint Detection and Response Systems against Advanced Persistent Threats Attack Vectors, Journal of Cybersecurity and Privacy, J. Cybersecur. Priv. 2021, 1, pp. 387-421.

Redis, A Vibrant, Open Source Database, Jul. 19, 2022.

Shalaginov et al., Malware Beaconing Detection by Mining Large-scale DNS Logs for Targeted Attack dentification, World Academy of Science, Engineering and Technology International Journal of Computer, Electrical, Automation, Control and Information Engineering vol. 10, No. 4, 2016, pp. 687-699.

Wikipedia, Median Absolute Deviation, Jul. 19, 2022.

Author Unknown, Bowley Skewness: Definition, Formula, Alternate Formula, Statistics How To, Jul. 19, 2022.

Github et al., Malleable-C2-Profiles/youtube_video.profile at master • xx0hcd/Malleable-C2-Profiles, Jul. 26, 2022.

Nakamura et al., Scanning and Host Fingerprinting Methods for Command and Control Server Detection, Master of Science in Software Engineering, Jun. 2021.

Mingcai Li, Construction and Application of HTTPS File Server[J]. Digital Technology and Application, 2020, vol. 38, No. 3, pp. 146-147 & 149.

\* cited by examiner

```
Host: www.google.com
sec-ch-ua: "Google Chrome"; v="95", "Chromium"; v="95", "; Not A Brand"; v="99"
sec-ch-ua-mobile: ?0
sec-ch-ua-platform: "macOS"
Sec-Fetch-Dest: document
Sec-Fetch-Mode: navigate
Sec-Fetch-Site: none
Sec-Fetch-User: ?1
Upgrade-Insecure-Requests: 1
User-Agent: Mozilla/5.0 (Macintosh; Intel Mac OS X 10_15_7) AppleWebKit/537.36 (KHTML, like Gecko) Ch
X-Client-Data: Cli2yQEIpbbJAQjBtskBCKmdygEI39HKAQiPhMsBCPDwywEI6/LLAQjv8ssBCJ75ywEI54TMAQi2hcwBCP+FzAE
  Decoded:
  message ClientVariations {
    // Active client experiment variation IDs.
    repeated int32 variation_id = [3300104, 3300133, 3300161, 3313321, 3320031, 3326479, 3340400, 334
3343563, 3344172];
    // Active client experiment variation IDs that trigger server-side behavior.
    repeated int32 trigger_variation_id = [3314860, 3342980];
```

▲ Internet Protocol Version 4, Src: 10.3.228.192, Dst: 10.3.228.11   a (00:0c:29:fb:87:7a)
▲ Transmission Control Protocol, Src Port: 443, Dst Port: 49451, Seq: 1, Ack: 137, Len: 86
▲ Transport Layer Security
  ▶ TLSv1 Record Layer: Handshake Protocol: Server Hello
       Content Type: Handshake (22)
       Version: TLS 1.0 (0x0301)
       Length: 81
    ▶ Handshake Protocol: Server Hello

```
0000  00 0c 29 fb 87 7a 00 50  56 23 08 00 45 00         ..)..z.P V#..E.
0010  00 7e 53 25 40 00 40 06  0a 83 0a 03 e4 c0 0a 03   .~S%@.@. ........
0020  e4 0b 01 bb c1 2b 18 cd  55 c6 54 4b 3a b7 50 18   .....+.. U.TK:.P.
0030  01 f5 4e 23 00 00 16 03  01 00 51 02 00 00 4d 03   ..N#.... ..Q...M.
0040  01 0d 31 da 3d f3 e2 3b  a4 11 03 63 14 e9 a5 7e   ..1.=..; ...c...~
0050  5d 94 af b2 09 9a ec 4d  7e 44 4f 57 4e 47 52 44   ]......M ~DOWNGRD
0060  00 20 6b 60 9c 24 06 18  3a 60 14 26 10 19 f9 09   . k`.$.. :`.&....
0070  71 96 47 aa d9 dc 99 d5  7e 6a 66 8a 25 18 33 97   q.G..... ~jf.%.3.
0080  0e 92 00 2f 00 00 05 ff  01 00 01 00               .../.... ....
```

FIG. 5E

| Address A | Port A | Address B | Port B | Packets | Bytes | Packets A→B |
|---|---|---|---|---|---|---|
| 10.3.228.11 | 49449 | 10.3.228.192 | 443 | 385 | 292k | 130 |
| 10.3.228.11 | 49451 | 10.3.228.192 | 443 | 19 | 3,097 | 9 |
| 10.3.228.11 | 49454 | 10.3.228.192 | 443 | 20 | 3,151 | 10 |
| 10.3.228.11 | 49456 | 10.3.228.192 | 443 | 19 | 3,097 | 9 |
| 10.3.228.11 | 49458 | 10.3.228.192 | 443 | 19 | 3,097 | 9 |
| 10.3.228.11 | 49463 | 10.3.228.192 | 443 | 19 | 3,097 | 9 |
| 10.3.228.11 | 49467 | 10.3.228.192 | 443 | 20 | 3,151 | 10 |
| 10.3.228.11 | 49473 | 10.3.228.192 | 443 | 20 | 3,151 | 10 |
| 10.3.228.11 | 49475 | 10.3.228.192 | 443 | 19 | 3,097 | 9 |
| 10.3.228.11 | 49478 | 10.3.228.192 | 443 | 19 | 3,097 | 9 |
| 10.3.228.11 | 49481 | 10.3.228.192 | 443 | 19 | 3,097 | 9 |
| 10.3.228.11 | 49483 | 10.3.228.192 | 443 | 19 | 3,097 | 9 |
| 10.3.228.11 | 49485 | 10.3.228.192 | 443 | 19 | 3,097 | 9 |
| 10.3.228.11 | 49489 | 10.3.228.192 | 443 | 20 | 3,151 | 10 |
| 10.3.228.11 | 49491 | 10.3.228.192 | 443 | 19 | 3,097 | 9 |
| 10.3.228.11 | 49493 | 10.3.228.192 | 443 | 19 | 3,097 | 9 |
| 10.3.228.11 | 49497 | 10.3.228.192 | 443 | 20 | 3,151 | 10 |
| 10.3.228.11 | 49500 | 10.3.228.192 | 443 | 19 | 3,097 | 9 |
| 10.3.228.11 | 49502 | 10.3.228.192 | 443 | 19 | 3,097 | 9 |
| 10.3.228.11 | 49507 | 10.3.228.192 | 443 | 20 | 3,151 | 10 |
| 10.3.228.11 | 49513 | 10.3.228.192 | 443 | 19 | 3,097 | 9 |
| 10.3.228.11 | 49518 | 10.3.228.192 | 443 | 19 | 3,097 | 9 |
| 10.3.228.11 | 49522 | 10.3.228.192 | 443 | 19 | 3,097 | 9 |
| 10.3.228.11 | 49532 | 10.3.228.192 | 443 | 19 | 3,097 | 9 |
| 10.3.228.11 | 49542 | 10.3.228.192 | 443 | 19 | 3,097 | 9 |
| 10.3.228.11 | 49557 | 10.3.228.192 | 443 | 19 | 3,097 | 9 |
| 10.3.228.11 | 49563 | 10.3.228.192 | 443 | 19 | 3,097 | 9 |
| 10.3.228.11 | 49568 | 10.3.228.192 | 443 | 19 | 3,097 | 9 |
| 10.3.228.11 | 49575 | 10.3.228.192 | 443 | 19 | 3,097 | 9 |
| 10.3.228.11 | 49585 | 10.3.228.192 | 443 | 19 | 3,097 | 9 |
| 10.3.228.11 | 49594 | 10.3.228.192 | 443 | 19 | 3,097 | 9 |
| 10.3.228.11 | 49600 | 10.3.228.192 | 443 | 19 | 3,097 | 9 |
| 10.3.228.11 | 49605 | 10.3.228.192 | 443 | 19 | 3,097 | 9 |
| 10.3.228.11 | 49609 | 10.3.228.192 | 443 | 19 | 3,097 | 9 |
| 10.3.228.11 | 49616 | 10.3.228.192 | 443 | 19 | 3,097 | 9 |
| 10.3.228.11 | 49618 | 10.3.228.192 | 443 | 20 | 3,151 | 10 |
| 10.3.228.11 | 49622 | 10.3.228.192 | 443 | 19 | 3,097 | 9 |
| 10.3.228.11 | 49624 | 10.3.228.192 | 443 | 19 | 3,097 | 9 |
| 10.3.228.11 | 49626 | 10.3.228.192 | 443 | 19 | 3,097 | 9 |
| 10.3.228.11 | 49630 | 10.3.228.192 | 443 | 19 | 3,097 | 9 |
| 10.3.228.11 | 49632 | 10.3.228.192 | 443 | 19 | 3,097 | 9 |
| 10.3.228.11 | 49634 | 10.3.228.192 | 443 | 19 | 3,097 | 9 |
| 10.3.228.11 | 49636 | 10.3.228.192 | 443 | 20 | 3,151 | 10 |
| 10.3.228.11 | 49640 | 10.3.228.192 | 443 | 19 | 3,097 | 9 |
| 10.3.228.11 | 49644 | 10.3.228.192 | 443 | 20 | 3,151 | 10 |
| 10.3.228.11 | 49646 | 10.3.228.192 | 443 | 19 | 3,097 | 9 |
| 10.3.228.11 | 49648 | 10.3.228.192 | 443 | 19 | 3,097 | 9 |
| 10.3.228.11 | 49652 | 10.3.228.192 | 443 | 20 | 3,151 | 10 |
| 10.3.228.11 | 49654 | 10.3.228.192 | 443 | 20 | 3,273 | 10 |
| 10.3.228.11 | 49656 | 10.3.228.192 | 443 | 20 | 3,071 | 10 |

FIG. 5F

| Bytes A→B | Packets B→A | Bytes B→A | Rel Start | Duration | Bits/s A→B |
|---|---|---|---|---|---|
| 7,675 | 255 | 285k | 0.000000 | 5.8772 | 10k |
| 1,365 | 10 | 1,732 | 5.879731 | 5.6958 | 1,917 |
| 1,419 | 10 | 1,732 | 71.582313 | 5.6964 | 1,992 |
| 1,365 | 10 | 1,732 | 137.277606 | 5.6790 | 1,922 |
| 1,365 | 10 | 1,732 | 202.963427 | 5.6919 | 1,918 |
| 1,365 | 10 | 1,732 | 268.655266 | 5.6875 | 1,920 |
| 1,419 | 10 | 1,732 | 334.330347 | 5.7132 | 1,986 |
| 1,419 | 10 | 1,732 | 400.042955 | 5.6953 | 1,993 |
| 1,365 | 10 | 1,732 | 465.749882 | 5.6809 | 1,922 |
| 1,365 | 10 | 1,732 | 531.441818 | 5.6930 | 1,918 |
| 1,365 | 10 | 1,732 | 597.150884 | 5.7054 | 1,913 |
| 1,365 | 10 | 1,732 | 662.855954 | 5.6947 | 1,917 |
| 1,365 | 10 | 1,732 | 728.563296 | 5.7072 | 1,913 |
| 1,419 | 10 | 1,732 | 794.272761 | 131.4291 | 86 |
| 1,365 | 10 | 1,732 | 859.993936 | 5.6922 | 1,918 |
| 1,365 | 10 | 1,732 | 925.701981 | 5.7308 | 1,905 |
| 1,419 | 10 | 1,732 | 991.441516 | 5.7184 | 1,985 |
| 1,365 | 10 | 1,732 | 1057.162194 | 5.7168 | 1,910 |
| 1,365 | 10 | 1,732 | 1122.885308 | 5.6990 | 1,916 |
| 1,419 | 10 | 1,732 | 1188.592616 | 5.7065 | 1,989 |
| 1,365 | 10 | 1,732 | 1254.299985 | 5.6934 | 1,918 |
| 1,365 | 10 | 1,732 | 1320.007357 | 5.6944 | 1,917 |
| 1,365 | 10 | 1,732 | 1385.714354 | 5.6806 | 1,922 |
| 1,365 | 10 | 1,732 | 1451.406466 | 5.6905 | 1,918 |
| 1,365 | 10 | 1,732 | 1517.098020 | 5.7135 | 1,911 |
| 1,365 | 10 | 1,732 | 1582.820732 | 5.7234 | 1,907 |
| 1,365 | 10 | 1,732 | 1648.543962 | 5.7805 | 1,889 |
| 1,365 | 10 | 1,732 | 1714.329265 | 5.7275 | 1,906 |
| 1,365 | 10 | 1,732 | 1780.067546 | 5.7148 | 1,910 |
| 1,365 | 10 | 1,732 | 1845.790494 | 5.7156 | 1,910 |
| 1,365 | 10 | 1,732 | 1911.516198 | 5.6984 | 1,916 |
| 1,365 | 10 | 1,732 | 1977.220573 | 5.6918 | 1,918 |
| 1,365 | 10 | 1,732 | 2042.912420 | 5.7118 | 1,911 |
| 1,365 | 10 | 1,732 | 2108.635421 | 5.7138 | 1,911 |
| 1,365 | 10 | 1,732 | 2174.358532 | 5.7013 | 1,915 |
| 1,419 | 10 | 1,732 | 2240.065358 | 5.6955 | 1,993 |
| 1,365 | 10 | 1,732 | 2305.775228 | 5.7222 | 1,908 |
| 1,365 | 10 | 1,732 | 2371.511588 | 5.7277 | 1,906 |
| 1,365 | 10 | 1,732 | 2437.249849 | 5.7300 | 1,905 |
| 1,365 | 10 | 1,732 | 2502.988396 | 5.7119 | 1,911 |
| 1,365 | 10 | 1,732 | 2568.711756 | 5.7287 | 1,906 |
| 1,365 | 10 | 1,732 | 2634.449907 | 6.7132 | 1,911 |
| 1,419 | 10 | 1,732 | 2700.176277 | 5.7115 | 1,987 |
| 1,365 | 10 | 1,732 | 2765.895846 | 5.7036 | 1,914 |
| 1,419 | 10 | 1,732 | 2831.603068 | 131.4300 | 86 |
| 1,365 | 10 | 1,732 | 2897.313367 | 5.7090 | 1,912 |
| 1,365 | 10 | 1,732 | 2963.033099 | 5.7055 | 1,913 |
| 1,419 | 10 | 1,732 | 3028.741024 | 77.0913 | 147 |
| 1,419 | 10 | 1,854 | 3094.450040 | 5.6916 | 1,994 |
| 1,355 | 10 | 1,716 | 3100.142312 | 5.6904 | 1,904 |

FIG. 5F (Cont.)

| No. | Time | Source | Destination | Protocol | Length | Info |
|---|---|---|---|---|---|---|
| 386 | 5.879731 | 10.3.228.11 | 10.3.228.192 | TCP | 66 | 49451 - 443 [SYN] Seq=0 Win=8192 Len=0 MSS=1460 WS=4 SACK_PERM=1 |
| 387 | 5.879890 | 10.3.228.192 | 10.3.228.11 | TCP | 66 | 443 - 49451 [SYN, ACK] Seq=0 Ack=1 Win=64240 Len=0 MSS=1460 SACK_PERM=1 WS=128 |
| 388 | 5.879930 | 10.3.228.11 | 10.3.228.192 | TCP | 54 | 49451 - 443 [ACK] Seq=1 Ack=1 Win=65700 Len=0 |
| 389 | 5.880127 | 10.3.228.11 | 10.3.228.192 | TLSv1 | 190 | Client Hello |
| 390 | 5.880238 | 10.3.228.192 | 10.3.228.11 | TCP | 60 | 443 - 49451 [ACK] Seq=1 Ack=137 Win=64128 Len=0 |
| 391 | 5.897155 | 10.3.228.192 | 10.3.228.11 | TLSv1 | 140 | Server Hello |
| 392 | 6.099126 | 10.3.228.192 | 10.3.228.11 | TLSv1 | 885 | Certificate, Server Hello Done |
| 393 | 6.099212 | 10.3.228.11 | 10.3.228.192 | TCP | 54 | 49451 - 443 [ACK] Seq=137 Ack=918 Win=64780 Len=0 |
| 394 | 6.099835 | 10.3.228.11 | 10.3.228.192 | TLSv1 | 380 | Client Key Exchange, Change Cipher Spec, Encrypted Handshake Message |
| 395 | 6.099979 | 10.3.228.192 | 10.3.228.11 | TCP | 60 | 443 - 49451 [ACK] Seq=918 Ack=463 Win=64128 Len=0 |
| 396 | 6.110521 | 10.3.228.192 | 10.3.228.11 | TLSv1 | 60 | Change Cipher Spec |
| 397 | 6.324813 | 10.3.228.11 | 10.3.228.192 | TCP | 54 | 49451 - 443 [ACK] Seq=463 Ack=924 Win=64776 Len=0 |
| 398 | 6.325152 | 10.3.228.192 | 10.3.228.11 | TLSv1 | 107 | Encrypted Handshake Message |
| 399 | 6.543106 | 10.3.228.11 | 10.3.228.192 | TCP | 54 | 49451 - 443 [ACK] Seq=463 Ack=977 Win=64724 Len=0 |
| 400 | 11.569916 | 10.3.228.11 | 10.3.228.192 | TLSv1 | 459 | Application Data |
| 401 | 11.570221 | 10.3.228.192 | 10.3.228.11 | TCP | 60 | 443 - 49451 [ACK] Seq=977 Ack=868 Win=64128 Len=0 |
| 402 | 11.575321 | 10.3.228.192 | 10.3.228.11 | TLSv1 | 203 | Application Data |
| 403 | 11.575496 | 10.3.228.192 | 10.3.228.11 | TLSv1 | 91 | Encrypted Alert |
| 404 | 11.575532 | 10.3.228.11 | 10.3.228.192 | TCP | 54 | 49451 - 443 [ACK] Seq=868 Ack=1164 Win=64536 Len=0 |

```
public static long checksum8(String text) {
    if (text.length() < 4) {
        return 0L;
    } else {
        text = text.replace("/", "");
        long sum = 0L;
        for(int x = 0; x < text.length(); ++x) {
            sum += (long)text.charAt(x);
        }
        return sum % 256L;
    }
} public static boolean isStager(String uri) {
    return checksum8(uri) = 92L;
} public static boolean isStagerX64(String uri) {
    return checksum8(uri) == 93L && uri.matches("/[A-Za-z0-9]{4}");
}
```

FIG. 8

▼ Answers
  ▼ aaa.stage.1133668: type TXT, class IN
    Name: aaa.stage.1133668
    Type: TXT (Text strings) (16)
    Class: IN (0x0001)
    Time to live: 1 (1 second)
    Data length: 256
    TXT Length: 255
    TXT [truncated]: WYIIIIIIIIIIIII7QZjAXP0A0AkAAQ2AB2BB0BBABXP8ABuJIIyt

[Request In: 3]
[Time: 0.000445000 seconds]

FIG. 9B

COBALT STRIKE BEACON HTTPS C2 HEURISTIC DETECTION

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 5A illustrates example attributes associated with Cobalt Strike Beacon HTTP traffic that is used for heuristic detection in accordance with some embodiments.

FIG. 5B illustrates additional example attributes associated with Cobalt Strike Beacon HTTP traffic that is used for heuristic detection in accordance with some embodiments.

FIG. 5D illustrates additional example attributes associated with Cobalt Strike Beacon HTTP traffic that is used for heuristic detection in accordance with some embodiments.

FIG. 5E illustrates additional example attributes associated with Cobalt Strike Beacon HTTPS traffic that is used for heuristic detection in accordance with some embodiments.

FIG. 5F illustrates additional example attributes associated with Cobalt Strike Beacon HTTPS traffic that is used for heuristic detection in accordance with some embodiments.

FIG. 5G illustrates additional example attributes associated with Cobalt Strike Beacon HTTPS traffic that is used for heuristic detection in accordance with some embodiments.

FIG. 8 illustrates a checksum algorithm for probing logic for HTTP/HTTPS Cobalt Strike TeamServer detection in accordance with some embodiments.

FIG. 9B illustrates an example DNS response to active probing of a target in accordance with some embodiments.

DETAILED DESCRIPTION

Figure 1:
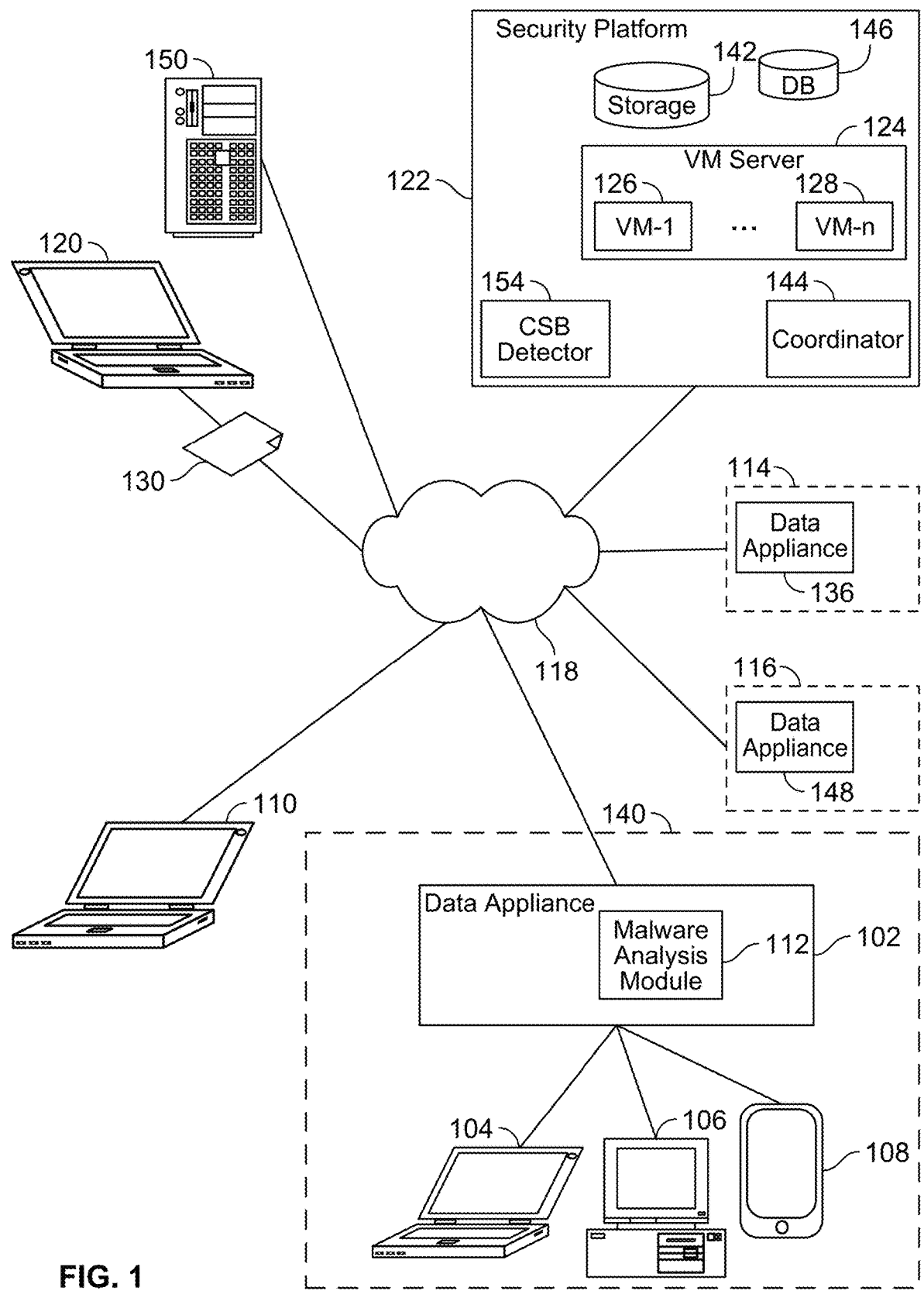
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Overview of Techniques for Cobalt Strike Beacon HTTP/HTTPS C2 Heuristic Detection Generally, existing anti-malware security solutions often fail to detect new malware or new malware variants based on malware signatures (e.g., predefined patterns, such as Intrusion Prevention System (IPS) signatures). Specifically, existing anti-malware security solutions generally fail to detect new malware or new malware variants if a malware signature for that new malware or new malware variant does not yet exist (e.g., currently, signature-based content IPS solutions generally cannot detect the Cobalt Strike Beacon C2 traffic effectively as only the default profile(s) or known profile(s) can typically be detected using existing signature-based content IPS solutions). These shortcomings associated with existing malware solutions expose enterprises to significant security risks due to the failure to detect such new malware or new malware variants.

Cobalt Strike is an example of a type of malware using evasion techniques to bypass malware solutions dependent on pattern matching based on preexisting malware signatures (e.g., penetration testing service providers (pen testers) often use Cobalt Strike (CS) tools to test commercially available security solutions, such as firewall security solutions). Cobalt Strike is a commercially/publicly available toolkit that is often used by researchers and penetration testers. However, it can also be used by attackers/hackers to infiltrate enterprise networks for unauthorized/nefarious purposes (e.g., exfiltration of confidential/proprietary data associated with enterprise networks, etc.).

Specifically, malware writers can use a self-defined command and control (C2 or C&C) profile configuration for Cobalt Strike to avoid malware solutions dependent on pattern matching based on preexisting malware signatures. The Cobalt Strike toolkit generates C2 traffic that can be based on various protocols, including HyperText Transfer Protocol (HTTP), HyperText Transfer Protocol Secure (HTTPS), and Domain Name System (DNS) protocols.

Thus, what are needed are anti-malware security solutions that can efficiently and effectively detect Cobalt Strike Beacon C2 HTTP/HTTPS traffic.

Accordingly, new and improved techniques for Cobalt Strike Beacon HTTP/HTTPS C2 heuristic detection are disclosed.

A new malware detection solution is disclosed that includes a new behavior-based detection solution (e.g., using heuristic-based techniques) to efficiently and effectively detect Cobalt Strike beacon command-and-control (C2 or C&C) traffic (e.g., a type of malicious network communication between a C2 server and malware on an infected host) using HyperText Transfer Protocol (HTTP) or HyperText Transfer Protocol Secure (HTTPS) protocols. The new malware detection solution can determine a verdict of the sample as malware using heuristics to facilitate detection of Cobalt Strike Beacon C2 HTTP/HTTPS traffic based on the monitored network traffic activity even if there is not an existing IPS signature that would effectively detect the Cobalt Strike Beacon C2 HTTP/HTTPS traffic.

Specifically, a new behavior-based detection solution for detecting Cobalt Strike Beacon C2 HTTP/HTTPS traffic is disclosed that includes a detection system (e.g., including an Intrusion Prevention System (IPS)) and a quality check system. The detection system can facilitate detection of Cobalt Strike Beacon C2 HTTP/HTTPS traffic using heuristic-based techniques, such as will be further described below with respect to various embodiments.

In some embodiments, a system/process/computer program product for Cobalt Strike Beacon HTTP/HTTPS C2 heuristic detection includes monitoring HTTP/HTTPS network traffic at a firewall; prefiltering the monitored HTTP/HTTPS network traffic at the firewall to select a subset of the HTTPS network traffic to forward to a cloud security service; determining whether the subset of the HTTP/HTTPS network traffic is associated with Cobalt Strike Beacon HTTP/HTTPS C2 traffic activity based on a plurality of heuristics; and performing an action in response to detecting the Cobalt Strike Beacon HTTP/HTTPS C2 traffic activity.

In some embodiments, a system/process/computer program product for Cobalt Strike Beacon HTTP/HTTPS C2 heuristic detection further includes using a fast match table of a detection system for storing previously detected Cobalt Strike HTTP/HTTPS C2 traffic activity, wherein the fast match table of the detection system stores a 3-tuple of previously detected Cobalt Strike Beacon HTTP/HTTPS C2 traffic activity, and wherein the 3-tuple includes a source IP address, a destination IP address, and a destination port.

In some embodiments, a system/process/computer program product for Cobalt Strike Beacon HTTP/HTTPS C2 heuristic detection further includes storing data statistics based on an automated heuristic analysis of the subset of the HTTP/HTTPS network traffic, wherein the data statistics are stored in a data statistics table of a detection system.

In some embodiments, a system/process/computer program product for Cobalt Strike Beacon HTTP/HTTPS C2 heuristic detection further includes performing a validation of the detected Cobalt Strike Beacon HTTP/HTTPS C2 traffic activity based on probing of a destination IP address associated with the detected Cobalt Strike Beacon HTTP/HTTPS C2 traffic activity and using a fingerprint data store.

Accordingly, new and improved security solutions that facilitate Cobalt Strike Beacon HTTP/HTTPS C2 heuristic detection using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) are disclosed in accordance with some embodiments.

These and other embodiments and examples for Cobalt Strike Beacon HTTP/HTTPS C2 heuristic detection will be further described below.

Example System Architectures for Cobalt Strike Beacon HTTP/HTTPS C2 Heuristic Detection Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, applying the disclosed techniques for automatically detecting Cobalt Strike beacon C2 HTTP/HTTPS traffic, as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware (e.g., including previously unknown/new variants of malware, such as C2 malware).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is C2 malware, such as similarly described above. Other forms of malware (e.g., keyloggers) can also be detected/thwarted using the disclosed techniques for sample traffic based self-learning malware detection as will be further described herein.

Techniques described herein can be used in conjunction with a variety of platforms (e.g., servers, computing appliances, virtual/container environments, desktops, mobile devices, gaming platforms, embedded systems, etc.) and/or for automated detection of a variety of forms of malware (e.g., new and/or variants of malware, such as C2 malware, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
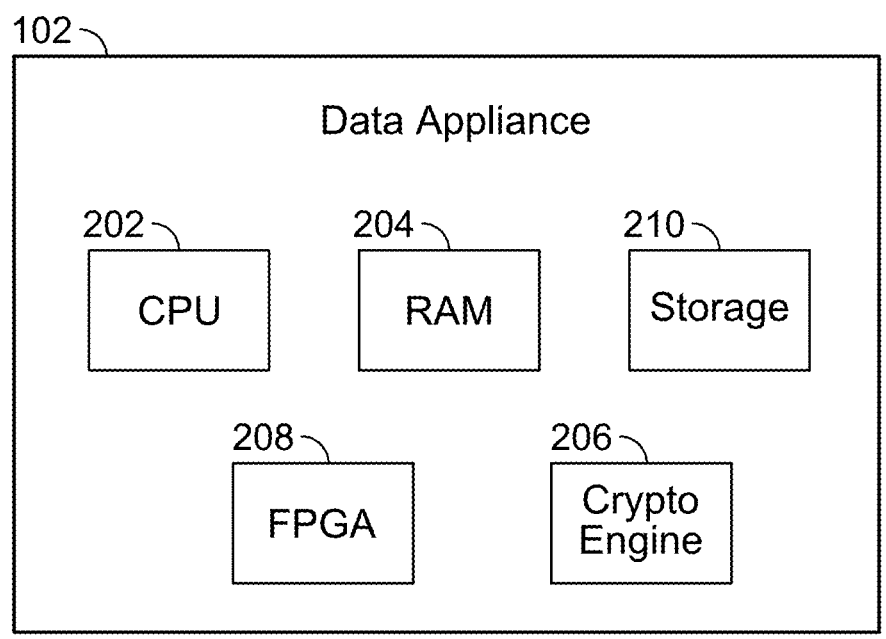
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models (e.g., such as for sample traffic based self-learning malware detection, include C2 ML models, as further described herein). Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
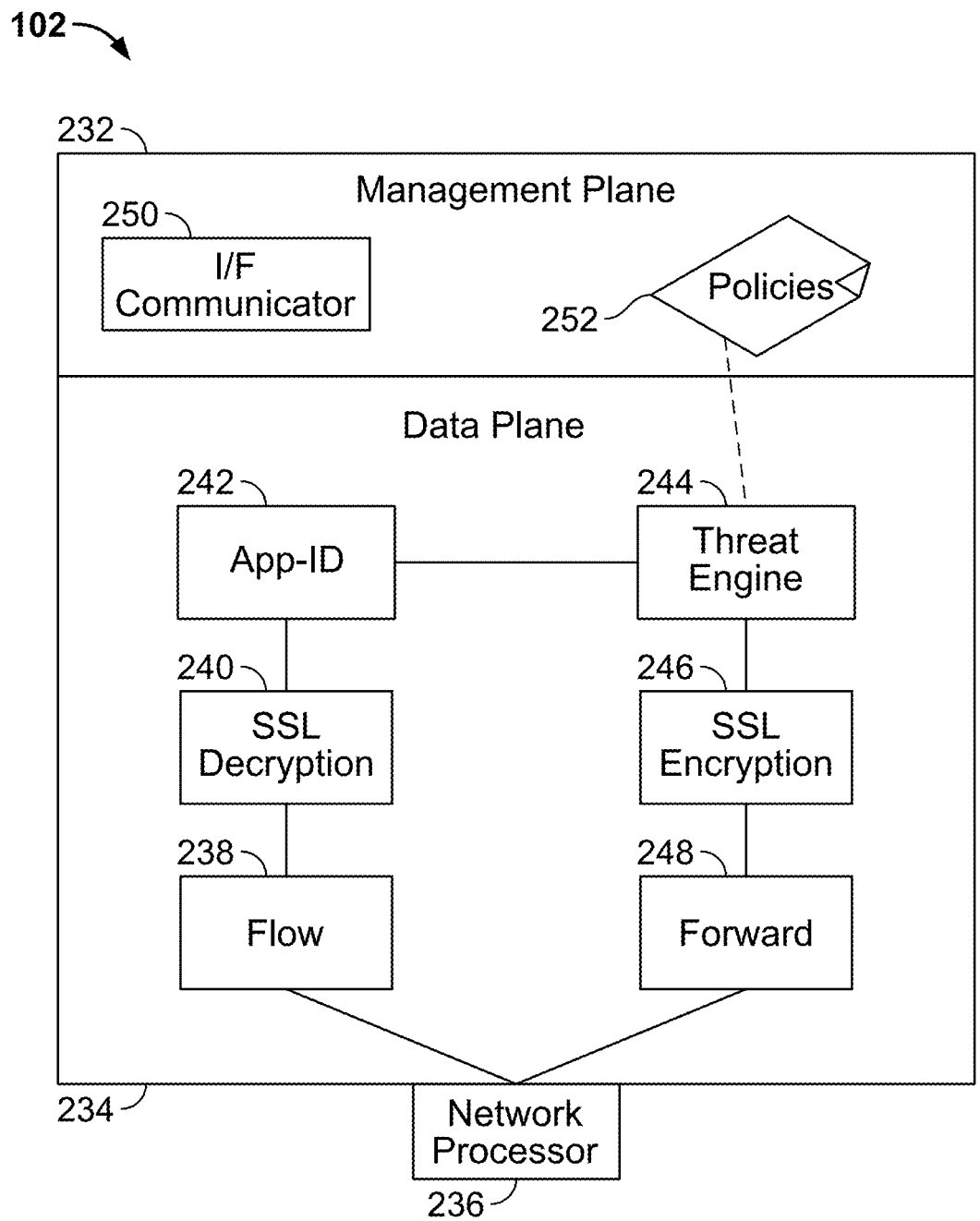
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance

102. For example, a user may initially browse to a corporate Wiki (classified based on the URL visited as "Web Browsing—Productivity") and then subsequently browse to a social networking site (classified based on the URL visited as "Web Browsing—Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include C2 malware detection policies using the disclosed techniques for sample traffic based self-learning malware detection. An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130, such as malware for generating Cobalt Strike beacon C2 HTTP/HTTPS traffic using a new/variant profile to avoid detection by preexisting IPS signatures (e.g., the malware can be delivered to endpoint devices of users via a compromised web site when the user visits/browses to the compromised web site or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C2/C&C) server 150, as well as to receive instructions from C2 server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for sample traffic based self-learning malware detection and block access from Alice's client device 104 to the packed malware content and to thereby preempt and prevent any such download of malware 130 to Alice's client device 104. As will be further described below, data appliance 102 performs the disclosed techniques for sample traffic based self-learning malware detection, such as further described below, to detect and block such malware 130 from harming Alice's client device 104.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD hash of malware 130), data appliance 102 can prevent the transmission of malware 130 to client device 104 accordingly (e.g., by detecting that an MD5 hash of the email attachment sent to client device 104 matches the MD hash of malware 130). Security platform 122 can also provide to data appliance 102 a list of known malicious domains and/or IP addresses, allowing data appliance 102 to block traffic between enterprise network 140 and C2 server 150 (e.g., where C&C server 150 is known to be malicious). The list of malicious domains (and/or IP addresses) can also help data appliance 102 determine when one of its nodes has been compromised. For example, if client device 104 attempts to contact C2 server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 from data appliance 102 to perform cloud-based security analysis for performing sample traffic based self-learning malware detection, and the malware verdict can be sent back to data appliance 102 for enforcing the security policy to thereby safeguard Alice's client device 104 from execution of malware 130 (e.g., to block malware 130 from access on client device 104).

Further, security platform 122 can also provide other types of information to data appliance 102 (e.g., as part of a subscription) such as a set of information for performing the disclosed techniques for sample traffic based self-learning malware detection usable by data appliance 102 to perform inline analysis of such malware files as will be further described below.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware files, including for network traffic based heuristic IPS malware detection, etc. (e.g., daily, hourly, or some other interval, and/or based on an event configured by one or more policies). An example content package includes a Cobalt Strike Beacon (CSB) detector 154 and/or other information (e.g., ML-based detection models), such as further described below. The subscription can cover the analysis of just those files intercepted by data appliance 102 and sent to security platform 122 by data appliance 102, and can also cover signatures of malware known to security platform 122. As will be described in more detail below, platform 122 can also utilize other types of information/IL models for performing network traffic based heuristic IPS malware detection. Specifically, platform 122 can utilize CSB detector 154 (e.g., C2 ML model(s) that can be implemented as a plugin or sub-component of platform 122, such as will be further described below, such as with respect to FIGS. 4A and 4B), which can help data appliance 102 detect and perform inline blocking of potentially new/variant C2 malware (e.g., Cobalt Strike beacon C2 HTTP/HTTPS traffic).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
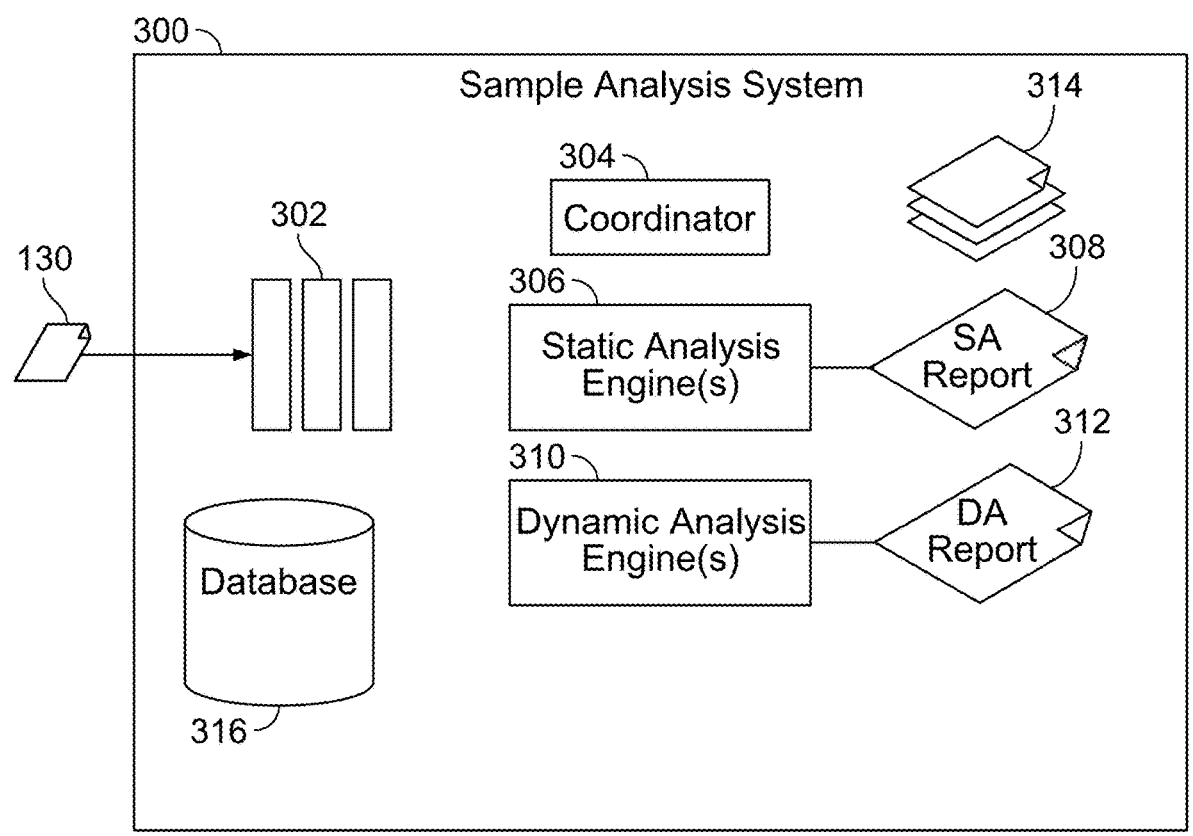
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C2/C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance (e.g., emulation/sandbox analysis of samples for malware detection, such as the above-described C2 malware detection based on monitored network traffic activity). In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

Cobalt Strike Beacon HTTP C2 Heuristic Detection

Figure 4A:
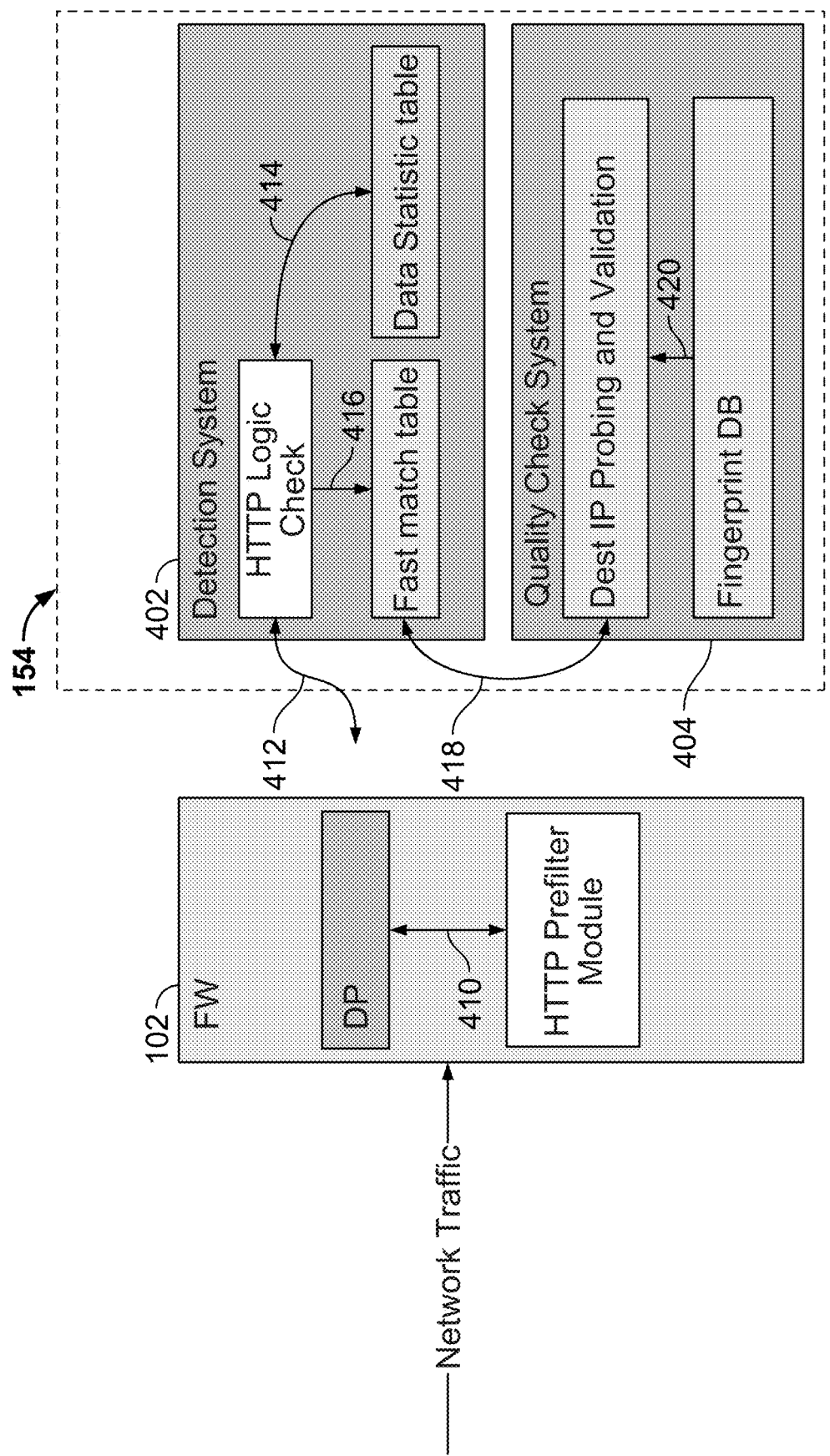
FIG. 4A illustrates portions of an example embodiment of a detection system and a quality check system for processing of network traffic for performing Cobalt Strike Beacon C2 HTTP traffic detection in accordance with some embodiments.

FIG. 4A illustrates portions of an example embodiment of a detection system and a quality check system for processing of network traffic for performing Cobalt Strike Beacon C2 HTTP traffic detection in accordance with some embodiments. As similarly discussed above, in various embodiments, security platform 122 includes a Cobalt Strike Beacon (CSB) detector 154. FIG. 4A illustrates subcomponents of CSB detector 154 including the following sub-components: a detection system 402 and a quality check system 404.

Referring to FIG. 4A, a behavior-based and cross-session detection solution for performing Cobalt Strike beacon C2 HTTP traffic detection is performed using a cloud-based security service (e.g., cloud security service 122 as shown in FIG. 1) in coordination with a data appliance (e.g., a data appliance implementing a firewall, also referred to below simply as a firewall) 102. The behavior-based detection solution performs a cross-session check and includes three components as will be described below.

Firewall 102 monitors network traffic on an enterprise network (e.g., including HTTP traffic on enterprise network 140, such as shown in FIG. 1). As shown at 410, firewall 102 monitors network traffic using a data plane and performs a prefiltering analysis of the network traffic using an HTTP prefilter module (e.g., sub-component). As shown at 412, firewall 102 forwards the traffic (e.g., a packet capture (pcap) file for the network traffic associated with the session(s)) to the detection system if the following prefiltering analysis for HTTP traffic is a hit (i.e., satisfies both of the following example criteria based on header length and header encoding format, which is selected to reduce the volume of traffic to be forwarded to cloud security 122 for further analysis to detect potential Cobalt Strike Beacon C2 traffic, such as will be further described below). First, the HTTP prefiltering module determines whether the network traffic includes a header value or URI length check that matches a range of 171 bytes to 256 bytes. Second, the HTTP prefiltering module determines whether the network traffic includes a header value or URI length field with encoding that matches one of these types of encoding: base64, base64url, netbios, netbiosu, or mask. Based on experiments (e.g., testing results), the prefiltering reduces the amount of network traffic that is forwarded for further analysis by the cloud security service to only approximately 0.32% of the total network traffic.

Cobalt Strike Beacon (CSB) detector 154 includes detection system 402, which includes an HTTP logic check module (e.g., sub-component, which can be implemented using Python or another high-level programming language) that implements a decision tree based on the Source IP address (SrcIP), Destination IP address (DstIP), and Destination Port (DstPort) associated with each new session and performs the following checks based on data statistics associated with each new session. As an initial logic check, detection system 402 can determine whether there is a prior verdict stored in a fast match table and if there is a match based on the 3-tuple of SrcIP, DstIP, and DstPort, then the prior verdict is returned to firewall 102 without further analysis/processing by detection system 402.

Otherwise, processing proceeds to perform the following data statistic checks that are stored in a data statistics table as shown at 414. The following data statistic checks are performed for each session and stored in the data statistics table for performing a behavior-based detection of Cobalt Strike Beacon C2 HTTP traffic (e.g., using heuristic-based techniques as will now be further described). In an example implementation, the fast match table and data statistics tables can be implemented using an in-memory data structure store, such as using an open source (e.g., Redis, which is publicly available at https://redis.io/) or commercially available data store solution.

First, check the first twelve (12) sessions' timestamps to determine whether such is a Gaussian or normal distribution. In an example implementation, the Gaussian or normal distribution calculations can be implemented using the Bowley Skewness algorithm for a normal distribution calculation (e.g., the Bowley Skewness algorithm is publicly available at https://www.statisticshowto.com/bowley-skewness/), and, specifically, to check whether it is a normal distribution for the timestamps from the first twelve (12) sessions. The median absolute deviation is determined using the median absolute deviation algorithm (e.g., the median absolute deviation algorithm is publicly available at https://en.wikipedia.org/wiki/Median_absolute_deviation). Finally, the connection count distribution is determined for the time of timestamp difference (TSdiff) for twelve (12) sessions from 6 seconds to 556 seconds (e.g., 6/10-556/10, 1 second to 55 seconds per session, in this example implementation we choose 40 seconds for this connection count distribution calculation).

Second, check whether a timestamp gap between different sessions is less than 10 minutes (e.g., Cobalt Strike Beacon C2 HTTP traffic generally sends heartbeat traffic every 5-10 minutes to check-in/communicate with its C2/Cobalt Strike Beacon Team server with metadata).

Third, check whether the HTTP header's MD5 hash value is the same (e.g., meta data, including a cookie associated with the session(s), is the same for each compromised machine, which results in the HTTP header's MD5 being the same value for each session, new communication to its C2 Team server).

Fourth, check whether the HTTP header field amount (i.e., number of fields included in the HTTP header) is less than 10 fields in the HTTP header (e.g., due to a design limitation resulting from Cobalt Strike Beacon toolkit design implementation).

Fifth, check whether the HTTP header does not include a custom header.

Sixth, check whether the HTTP User-Agent (UA) is a popular UA (e.g., is a known/popular UA; an example listing of popular UAs is publicly available at https://www.whatismybrowser.com/guides/the-latest-user-agent/). Cobalt Strike Beacon C2 traffic generally is associated with using a known/popular UA as such HTTP network traffic attempts to simulate typical user traffic that would be associated with such known/popular UAs (e.g., commonly used web browsers, such as Microsoft IE, Chrome, Mozilla, etc.).

Based on the above-described heuristics, if these logic checks result in a match, then it is determined that the network traffic for such sessions is associated with Cobalt Strike Beacon C2 HTTP traffic. If there is not a match, then it is determined that the network traffic for such sessions is not associated with Cobalt Strike Beacon C2 HTTP traffic. The verdict is stored in the fast match table as shown at 416. Specifically, the 3-tuple (e.g., SrcIP, DstIP, Dstport) along with the verdict is added to the fast match table after the verdict is determined as described above using the detection system. As such, the detection system will query the fast match table for subsequent sessions as similarly described above to facilitate a more efficient determination of the verdict for previously analyzed HTTP traffic.

At 418, quality check system 404 performs a validation of results of detection system 402 to determine whether any prior verdicts were false positives or false negatives for Cobalt Strike Beacon C2 HTTP traffic. Specifically, a Destination (Dest) IP Probing and Validation module (e.g., sub-component) performs automated probing of the destination IP address by sending a custom HTTP request (e.g., custom HTTP/HTTPS/DNS request) to the destination IP address. As shown at 420, the Dest IP Probing and Validation module then determines whether a response includes a fingerprint associated with Cobalt Strike (e.g., HTTP response data includes a default certificate provided by Cobalt Strike and/or the HTTP response matches a fingerprint for Cobalt Strike (CS); in an example implementation, the CS fingerprint is a predetermined string that is included in response traffic from the CS TeamServer, for example when the client sends the HTTP request with a randomized URL to the CS TeamServer, the TeamServer will respond with the HTTP status code 404 and following example header Content-Type: text/plain\r\nDate: Wed, 27 Feb. 2019 14:43:19 GMT\r\nContent-Length: 0, as such, we can use the "Content-Type: text/plain" and Content-Length: 0 as the fingerprint to identify the CS TeamServer, such as further described below with respect to various embodiments) to validate a Cobalt Strike Beacon C2 HTTP traffic (CS) verdict for network traffic/sessions in communication with the destination IP address. As an example, the quality check system can perform a malware IP address lookup to determine whether the DestIP is associated with Cobalt Strike Beacon related malware (e.g., a known malware sample that was previously identified as Cobalt Strike Beacon related malware based on prior malware analysis), and if so, the Cobalt Strike Beacon C2 HTTP traffic (CS) verdict can be validated. Otherwise, the verdict is automatically changed from the CS verdict to a benign verdict (e.g., providing a feedback loop for improving CS detection heuristics implemented in detection system 402). As such, the quality check system can validate verdicts to attempt to detect any false positives or false negatives for Cobalt Strike Beacon C2 HTTP traffic.

The disclosed techniques for a behavior-based and cross-session detection solution for performing Cobalt Strike Beacon C2 HTTP traffic detection facilitate a 90% detection improvement rate for detection of Cobalt Strike Beacon C2 HTTP traffic based on experiments/testing results as compared with preexisting IPS signature-based approaches (e.g., for default/known profiles for Cobalt Strike Beacon C2 HTTP traffic).

Cobalt Strike Beacon HTTPS C2 Heuristic Detection

Figure 4B:
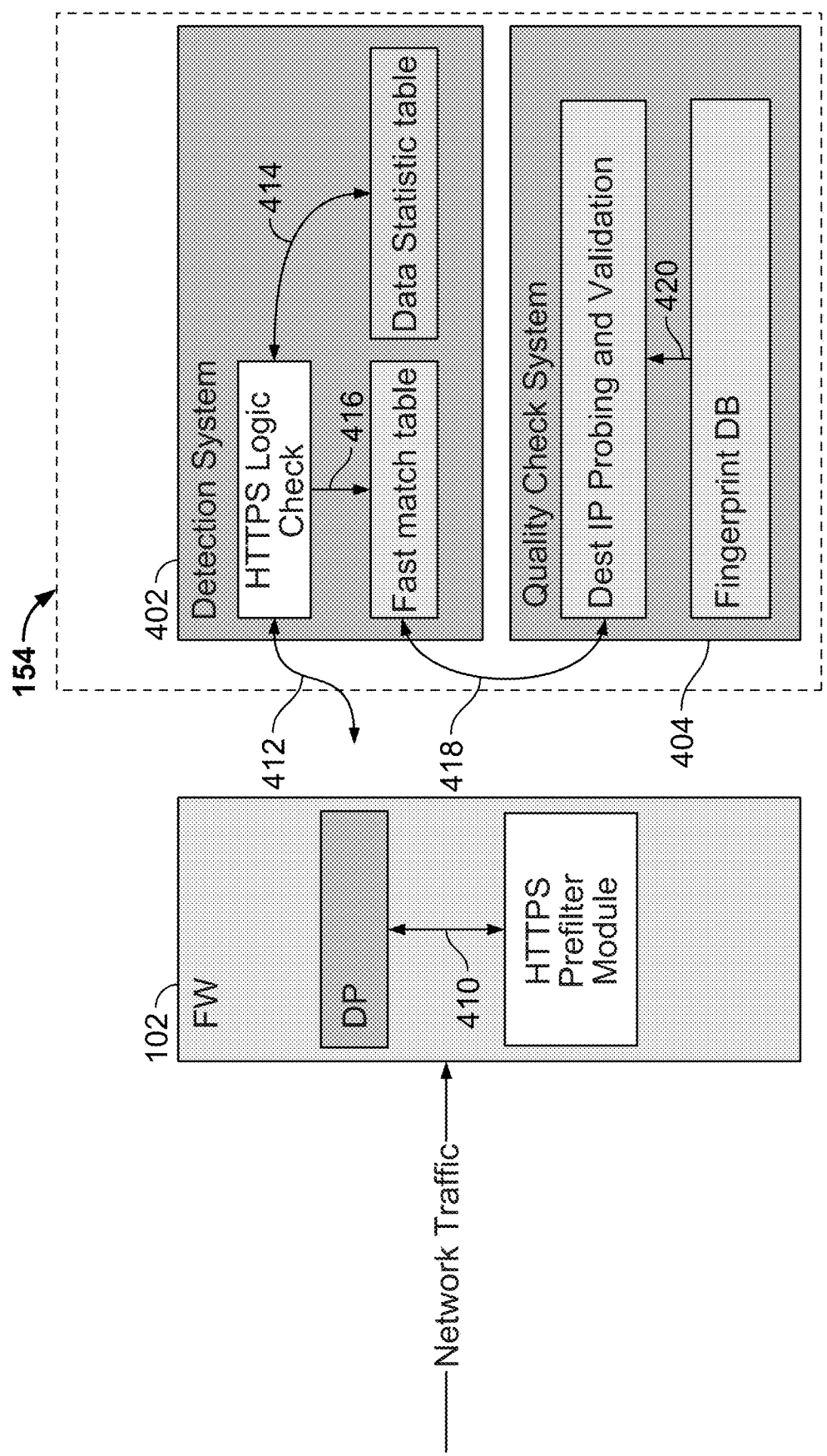
FIG. 4B illustrates portions of an example embodiment of a detection system and a quality check system for processing of network traffic for performing Cobalt Strike Beacon C2 HTTPS traffic detection in accordance with some embodiments.

FIG. 4B illustrates portions of an example embodiment of a detection system and a quality check system for processing of network traffic for performing Cobalt Strike Beacon C2 HTTPS traffic detection in accordance with some embodiments. As similarly discussed above with respect to FIG. 4A, security platform 122 includes a Cobalt Strike Beacon (CSB) detector 154. FIG. 4B similarly illustrates subcomponents of CSB detector 154 including the following subcomponents: a detection system 402 and a quality check system 404. However, as further described below, the HTTPS prefiltering logic module/sub-component and the HTTPS logic check module/sub-component perform different prefiltering and logic checks for the HTTPS traffic (e.g., as HTTPS traffic header/content is encrypted, distinct heuristics are disclosed herein for automatically detecting Cobalt Strike beacon C2 HTTPS traffic as will now be further described below).

Referring to FIG. 4B, a behavior-based and cross-session detection solution for performing Cobalt Strike beacon C2 HTTPS traffic detection is performed using a cloud-based security service (e.g., cloud security service 122 as shown in FIG. 1) in coordination with a firewall 102. The behavior-based detection solution performs a cross-session check and includes three components as will be described below.

Firewall 102 monitors network traffic on an enterprise network (e.g., including HTTP traffic on enterprise network 140, such as shown in FIG. 1). As shown at 410, firewall 102 monitors network traffic using a data plane and performs a prefiltering analysis of the network traffic using an HTTPS prefilter module (e.g., sub-component). As shown at 412, firewall 102 forwards the traffic (e.g., a packet capture (pcap) file for the network traffic associated with the session(s)) to detection system 402 if the following prefiltering analysis for HTTP traffic is a hit (i.e., satisfies both of the following example criteria based on Server hello random field value and includes "DOWNGRD" (e.g., this field value is present in Cobalt Strike beacon C2 HTTPS traffic but is also associated with benign traffic so this prefiltering is used prior to further analysis that is performed using the below described detection system that will check further heuristics), which is selected to reduce the volume of traffic to be forwarded to cloud security 122 for further analysis to detect potential Cobalt Strike Beacon C2 traffic, such as will be further described below). Specifically, the prefiltering module determines whether the Server hello random field value includes a "DOWNGRD" value. Based on experiments (e.g., testing results), the prefiltering reduces the amount of network traffic that is forwarded for further analysis by the cloud security service and is only approximately 0.002% of the total network traffic.

Cobalt Strike Beacon (CSB) detector 154 includes detection system 402, which includes an HTTPS logic check module (e.g., sub-component, which can be implemented using Python or another high-level programming language) that implements a decision tree based on the Source IP address (SrcIP), Destination IP address (DstIP), and Destination Port (DstPort) associated with each new session and performs the following checks based on data statistics associated with each new session. As an initial logic check, detection system 402 can determine whether there is a prior verdict stored in a fast match table and if there is a match based on the 3-tuple of SrcIP, DstIP, and DstPort, then the prior verdict is returned to firewall 102 without further analysis/processing by detection system 402.

Otherwise, processing proceeds to perform the following data statistic checks that are stored in a data statistics table as shown at 414. The following data statistic checks are performed for each session and stored in the data statistics table for performing a behavior-based detection of Cobalt Strike Beacon C2 HTTP traffic (e.g., using heuristic-based techniques as will now be further described). In an example implementation, the fast match table and data statistics tables can be implemented using an in-memory data structure store, such as using an open source (e.g., Redis, which is publicly available at https://redis.io/) or commercially available data store solution.

First, check the first twelve (12) sessions' timestamps to determine whether such is a Gaussian or normal distribution. In an example implementation, the Gaussian or normal distribution calculations can be implemented using the Bowley Skewness algorithm for a normal distribution calculation (e.g., the Bowley Skewness algorithm is publicly available at https://www.statisticshowto.com/bowley-skewness/), and, specifically, to check whether it is a normal distribution for the timestamps from the first twelve (12) sessions. The Median absolute deviation is determined using the Median absolute deviation algorithm (e.g., the Median absolute deviation algorithm is publicly available at https://en.wikipedia.org/wiki/Median_absolute_deviation). Finally, the connection count distribution is determined for the time of timestamp difference (TSdiff) for twelve (12) sessions from 6 seconds to 556 seconds (e.g., 6/10-556/10, 1 second to 55 seconds per session, in this example implementation we choose 40 seconds for this connection count distribution calculation).

Second, check the application data packet length from the HTTPS request to determine whether it is the same or not. If the application data packet length from the HTTPS request for each of these 12 sessions is the same length, then this is another heuristic that is used as another indicator that this is likely associated with Cobalt Strike beacon C2 HTTPS traffic.

Third, check whether there is only one application request data in the request direction, and if there is, this is another heuristic that is used as another indicator that this is likely associated with Cobalt Strike beacon C2 HTTPS traffic.

Based on the above-described heuristics, if these logic checks result in a match, then it is determined that the network traffic for such sessions is associated with Cobalt Strike Beacon C2 HTTP traffic. If there is not a match, then it is determined that the network traffic for such sessions is not associated with Cobalt Strike Beacon C2 HTTP traffic. The verdict is stored in the fast match table as shown at 416. Specifically, the 3-tuple (e.g., SrcIP, DstIP, Dstport) along with the verdict is added to a fast match table after the verdict is determined as described above using the detection system. As such, the detection system will query the fast match table for subsequent sessions as similarly described above to facilitate a more efficient determination of the verdict for previously analyzed HTTP traffic.

At 418, quality check system 404 performs a validation of results of detection system 402 to determine whether any prior verdicts were false positives or false negatives for Cobalt Strike Beacon C2 HTTPS traffic. Specifically, a Destination (Dest) IP Probing and Validation module (e.g., sub-component) performs automated probing of the destination IP address by sending a custom HTTPS request (e.g., custom HTTP/HTTPS/DNS request) to the destination IP address. As shown at 420, the Dest IP Probing and Validation module then determines whether a response includes a fingerprint associated with Cobalt Strike (e.g., HTTPS response data includes a default certificate provided by Cobalt Strike and/or the HTTPS response matches a fingerprint for Cobalt Strike (CS); in an example implementation, the CS fingerprint is a predetermined string that is be included in response traffic from the CS TeamServer, for example, when the client sends the HTTPS request with client hello to the CS TeamServer, the TeamServer will respond to the server hello and server certificate to the client, and by default the certificate includes the CS keyword "Major Cobalt Strike", as such, we can use the certificate keyword "Major Cobalt Strike" as the fingerprint to identify the CS TeamServer, such as further described below with respect to various embodiments) to validate a Cobalt Strike Beacon C2 HTTPS traffic (CS) verdict for network traffic/sessions in communication with the destination IP address. As an example, the quality check system can perform a malware IP address lookup to determine whether the DestIP is associated with Cobalt Strike Beacon related malware (e.g., a known malware sample that was previously identified as Cobalt Strike Beacon related malware based on prior malware analysis), and then the Cobalt Strike Beacon C2 HTTPS traffic (CS) verdict can be validated. Otherwise, the verdict is automatically changed from the CS verdict to a benign verdict (e.g., providing a feedback loop for improving CS detection heuristics implemented in detection system 402). As such, the quality check system can validate verdicts to attempt to detect any false positives or false negatives for Cobalt Strike Beacon C2 HTTPS traffic.

The disclosed techniques for a behavior-based and cross-session detection solution for performing Cobalt Strike Beacon C2 HTTPS traffic detection facilitate a 90% detection improvement rate for detection of Cobalt Strike Beacon C2 HTTPS traffic based on experiments/testing results as compared with preexisting IPS signature-based approaches (e.g., for default/known profiles for Cobalt Strike Beacon C2 HTTPS traffic).

Example Use Cases of Cobalt Strike Beacon HTTP C2 Heuristic Detection

Figure 5A:
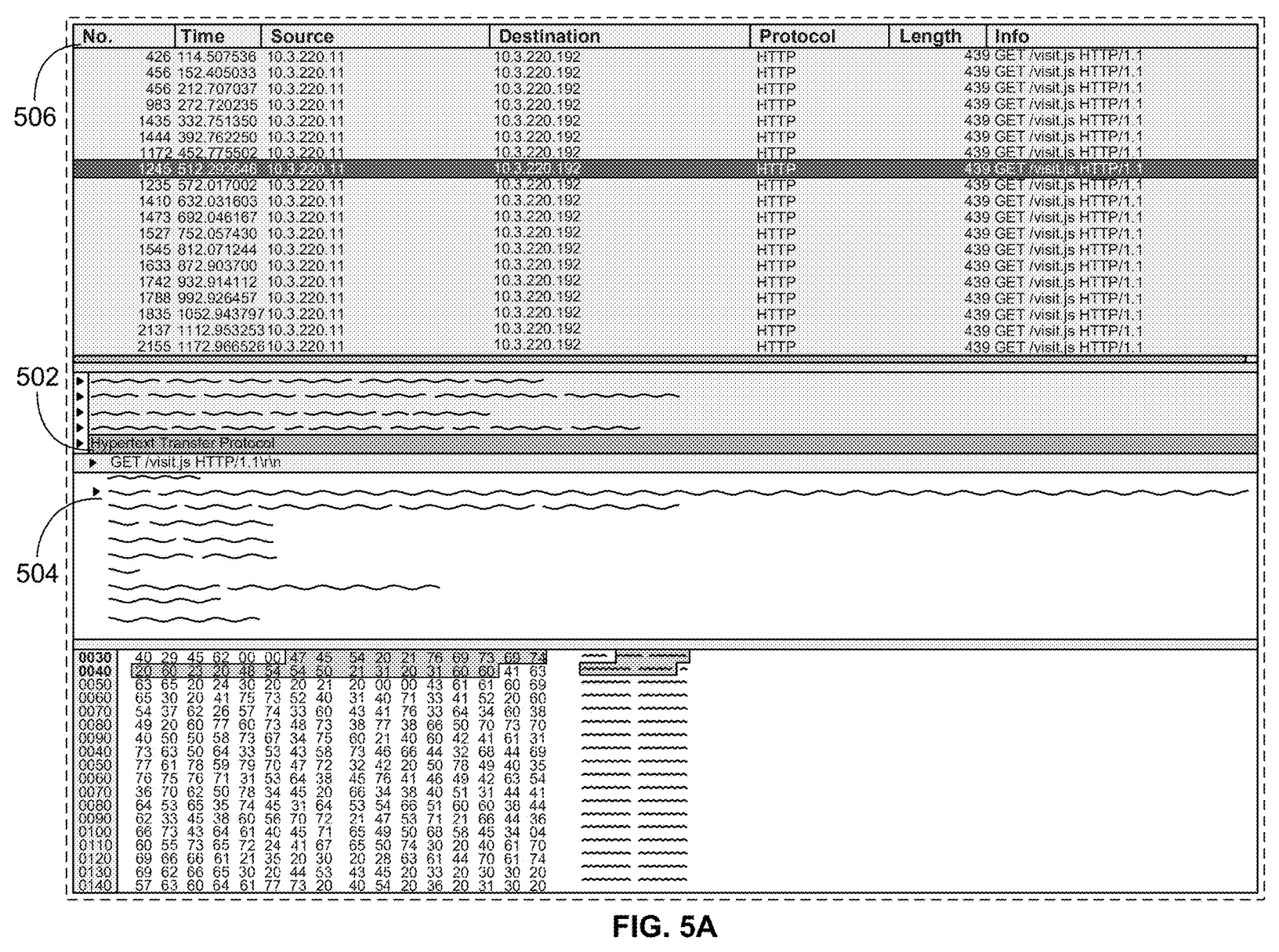

FIG. 5A illustrates example attributes associated with Cobalt Strike Beacon HTTP traffic that is used for heuristic detection in accordance with some embodiments. Referring to FIG. 5A, this example network traffic illustrates HTTP request headers MD hash that are the same as the request URL as shown at 502 and the cookie (e.g., encoding base64) as shown at 504 that are associated with the sessions for such Cobalt Strike Beacon HTTP traffic. As such, this example illustrates network traffic that satisfies the prefiltering criteria as similarly described above with respect to FIG. 4A. First, the header value or URI length check matches a range of 171 bytes to 256 bytes. Second, the network traffic includes a header value or URI length field with encoding of base64 and, thus, matches one of these types of encoding: base64, base64url, netbios, netbiosu, or mask. As a result, this network traffic as shown at 506 would be forwarded to cloud security 122 for further analysis using CSB detector 154 as similarly described above with respect to FIG. 4A.

Figure 5B:
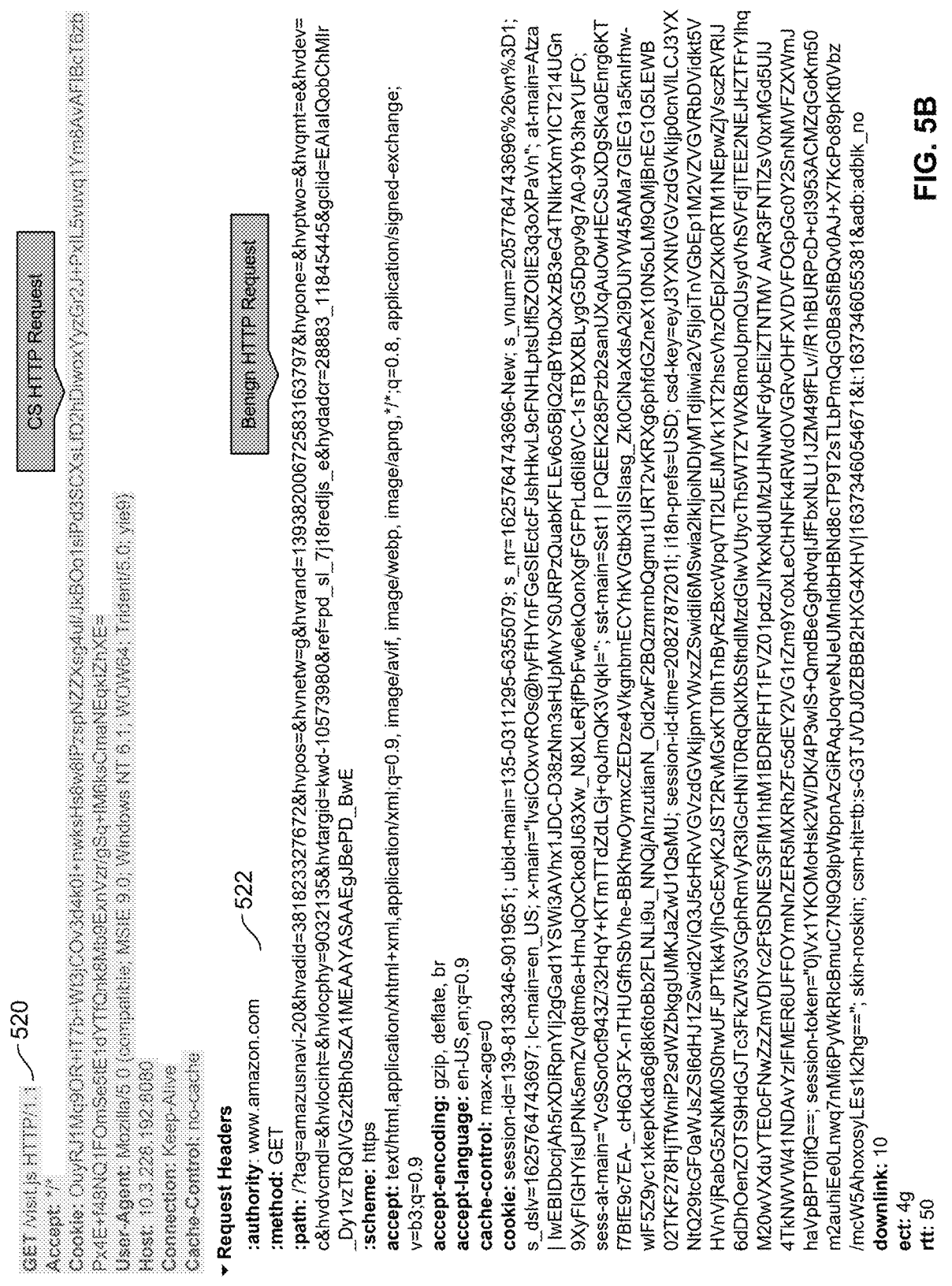

FIG. 5B illustrates additional example attributes associated with Cobalt Strike Beacon HTTP traffic that is used for heuristic detection in accordance with some embodiments. Referring to FIG. 5B, this example network traffic illustrates HTTP request header fields that are fewer than 10 request header fields as shown at 520 that is associated with a Cobalt Strike (CS) HTTP request (i.e., only six (6) request header fields are present in this example) as compared with a benign HTTP request at 522 that has a greater number of HTTP request header fields (i.e., greater than 10 request header fields) as shown at 522. As such, this example network traffic as shown at 520 satisfies the above-described fourth heuristic related to the HTTP header field amount (i.e., number of fields included in the HTTP header is less than 10 fields in the HTTP header) as similarly described above with respect to FIG. 4A.

Figure 5C:
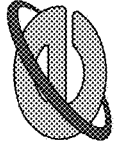
FIG. 5C illustrates additional example attributes associated with Cobalt Strike Beacon HTTP traffic that is used for heuristic detection in accordance with some embodiments.

FIG. 5C illustrates additional example attributes associated with Cobalt Strike Beacon HTTP traffic that is used for heuristic detection in accordance with some embodiments. Referring to FIG. 5C, this example network traffic illustrates HTTP user agent (UA) is a known UA and does not have a custom header as shown at 530. As such, this example network traffic as shown at 530 satisfies the above-described sixth heuristic related to whether the HTTP User-Agent (UA) is a known/popular UA as similarly described above with respect to FIG. 4A.

FIG. 5D illustrates additional example attributes associated with Cobalt Strike Beacon HTTP traffic that is used for heuristic detection in accordance with some embodiments. Referring to FIG. 5D, this example network traffic illustrates HTTP request header content that does not have a custom header as shown at 540. As such, this example network traffic as shown at 540 satisfies the above-described fifth heuristic related to whether the HTTP header does not include a custom header as similarly described above with respect to FIG. 4A.

Example Use Cases of Cobalt Strike Beacon HTTPS C2 Heuristic Detection

FIG. 5E illustrates additional example attributes associated with Cobalt Strike Beacon HTTPS traffic that is used for heuristic detection in accordance with some embodiments. Referring to FIG. 5E, as shown at 550, this example network traffic illustrates an HTTPS request in which the Server hello random field value includes a "DOWNGRD" value as similarly described above with respect to FIG. 4B. As a result, this network traffic as shown at 506 would be forwarded to cloud security 122 for further analysis using CSB detector 154 as similarly described above with respect to FIG. 4B.

FIG. 5F illustrates additional example attributes associated with Cobalt Strike Beacon HTTPS traffic that is used for heuristic detection in accordance with some embodiments. Referring to FIG. 5F, as shown at 560, this example network traffic illustrates the SSL application data amount in the request direction as similarly described above with respect to FIG. 4B. Specifically, as similarly described above with respect to FIG. 4B, the second check performed by the HTTPS logic module is to determine whether the application data packet length from the HTTPS request is the same or not. If the application data packet length from the HTTPS request for each of these 12 sessions is the same length as shown at 560 (e.g., 1365 bytes), then this is another heuristic that is used as another indicator that this is likely associated with Cobalt Strike beacon C2 HTTPS traffic.

FIG. 5G illustrates additional example attributes associated with Cobalt Strike Beacon HTTPS traffic that is used for heuristic detection in accordance with some embodiments. Referring to FIG. 5G, as shown at 570, this example network traffic illustrates the SSL application data amount in the request direction as similarly described above with respect to FIG. 4B. Specifically, as similarly described above with respect to FIG. 4B, the third check performed by the HTTPS logic module is to determine whether there is only one application request data (e.g., and length is 459 bytes) in the request direction (e.g., heuristics performed for each of these analyzed (12) sessions), which is another heuristic that is used as another indicator that this is likely associated with Cobalt Strike beacon C2 HTTPS traffic.

Additional example processes for the disclosed techniques for Cobalt Strike Beacon HTTP/HTTPS C2 heuristic detection will now be described.

Example Processes for Cobalt Strike Beacon HTTP C2 Heuristic Detection

Figure 6:
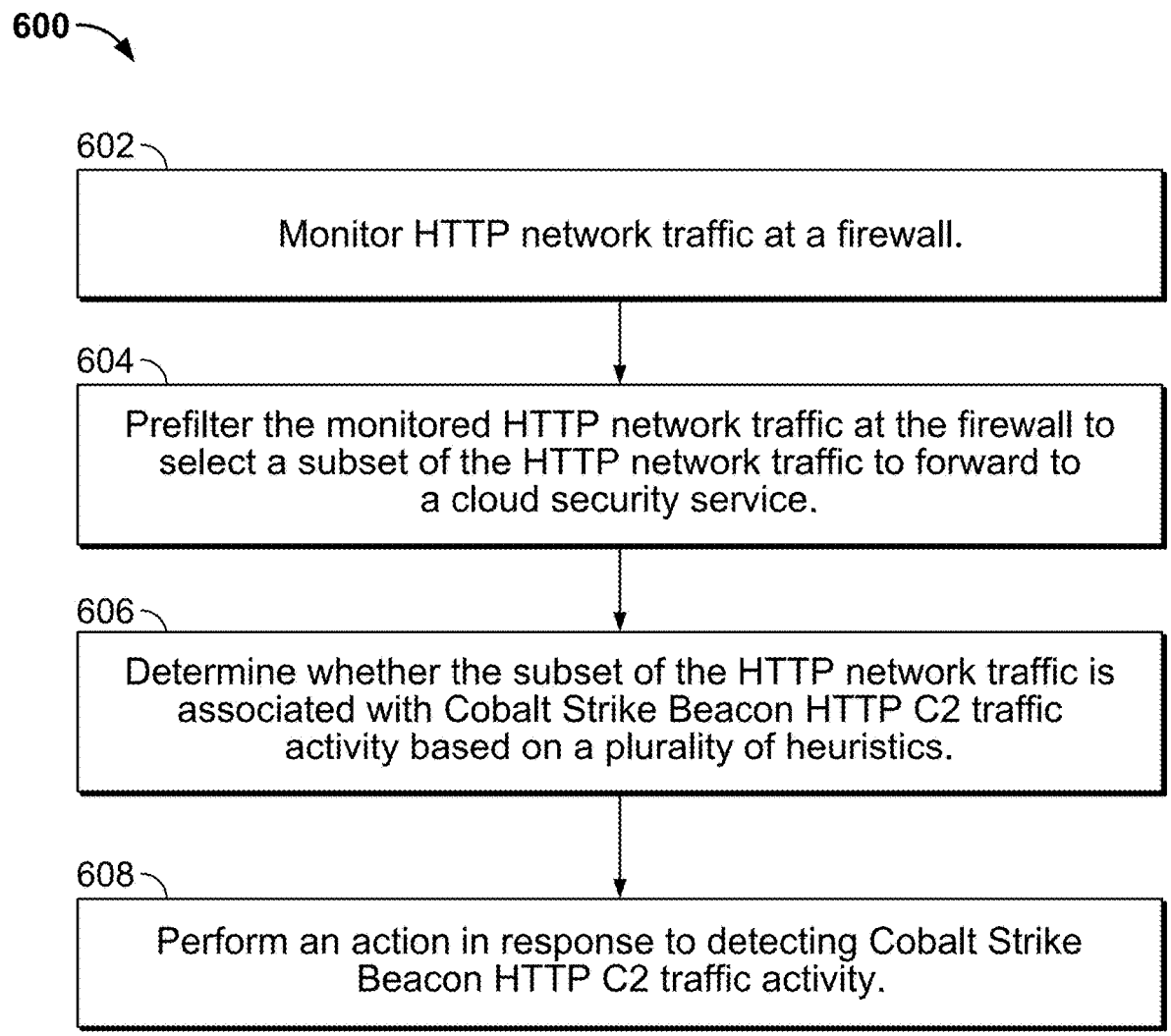
FIG. 6 is a flow diagram of a process for Cobalt Strike Beacon HTTP C2 heuristic detection in accordance with some embodiments.

FIG. 6 is a flow diagram of a process for Cobalt Strike Beacon HTTP C2 heuristic detection in accordance with some embodiments. In some embodiments, a process 600 as shown in FIG. 6 is performed by the security platform and techniques as similarly described above including the embodiments described above with respect to FIGS. 1-5G. In one embodiment, process 600 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, HTTP network traffic is monitored at a firewall. For example, the firewall can utilize an application identification to detect HTTP traffic, such as similarly described above with respect to FIGS. 1 and 4A.

At 604, prefiltering of the monitored HTTP network traffic is performed at the firewall to select a subset of the HTTP network traffic to forward to a cloud security service. For example, an HTTP prefiltering module can perform heuristic analysis of the HTTP network traffic to select a subset of HTTP traffic sessions to forward to the cloud security service for further analysis, such as similarly described above with respect to FIGS. 4A and 5A-5D.

At 606, determining whether the subset of the HTTP network traffic is associated with Cobalt Strike Beacon HTTP C2 traffic activity based on a plurality of heuristics is performed. For example, an HTTP logic check module can perform further heuristic analysis of the HTTP network traffic to automatically detect Cobalt Strike Beacon HTTP C2 traffic, such as similarly described above with respect to FIGS. 4A and 5A-5D.

At 608, an action is performed in response to detecting Cobalt Strike Beacon HTTP C2 traffic activity. The security platform (122) and/or data appliance (102) can then perform an action based on a policy (e.g., security/C2 related malware policy, which can be stored in policies 252 as shown in FIG. 2B) in response to the malware verdict. For example, the data appliance can be configured to block the Cobalt Strike Beacon HTTP C2 traffic activity. Other example actions can include blocking access to the destination IP address associated with the detected Cobalt Strike Beacon HTTP C2 traffic activity, blocking/dropping the network traffic associated with the detected Cobalt Strike Beacon HTTP C2 traffic activity and/or associated with that destination IP address, alerting an endpoint user and/or a network/security administrator that the endpoint was associated with the detected Cobalt Strike Beacon HTTP C2 traffic activity, quarantining an endpoint device associated with the detected Cobalt Strike Beacon HTTP C2 traffic activity, identifying the destination IP address, URL, etc. associated with the detected Cobalt Strike Beacon HTTP C2 traffic activity as malicious (or potentially malicious), and/or various other actions can also be performed based on the policy.

Example Processes for Cobalt Strike Beacon HTTPS C2 Heuristic Detection

Figure 7:
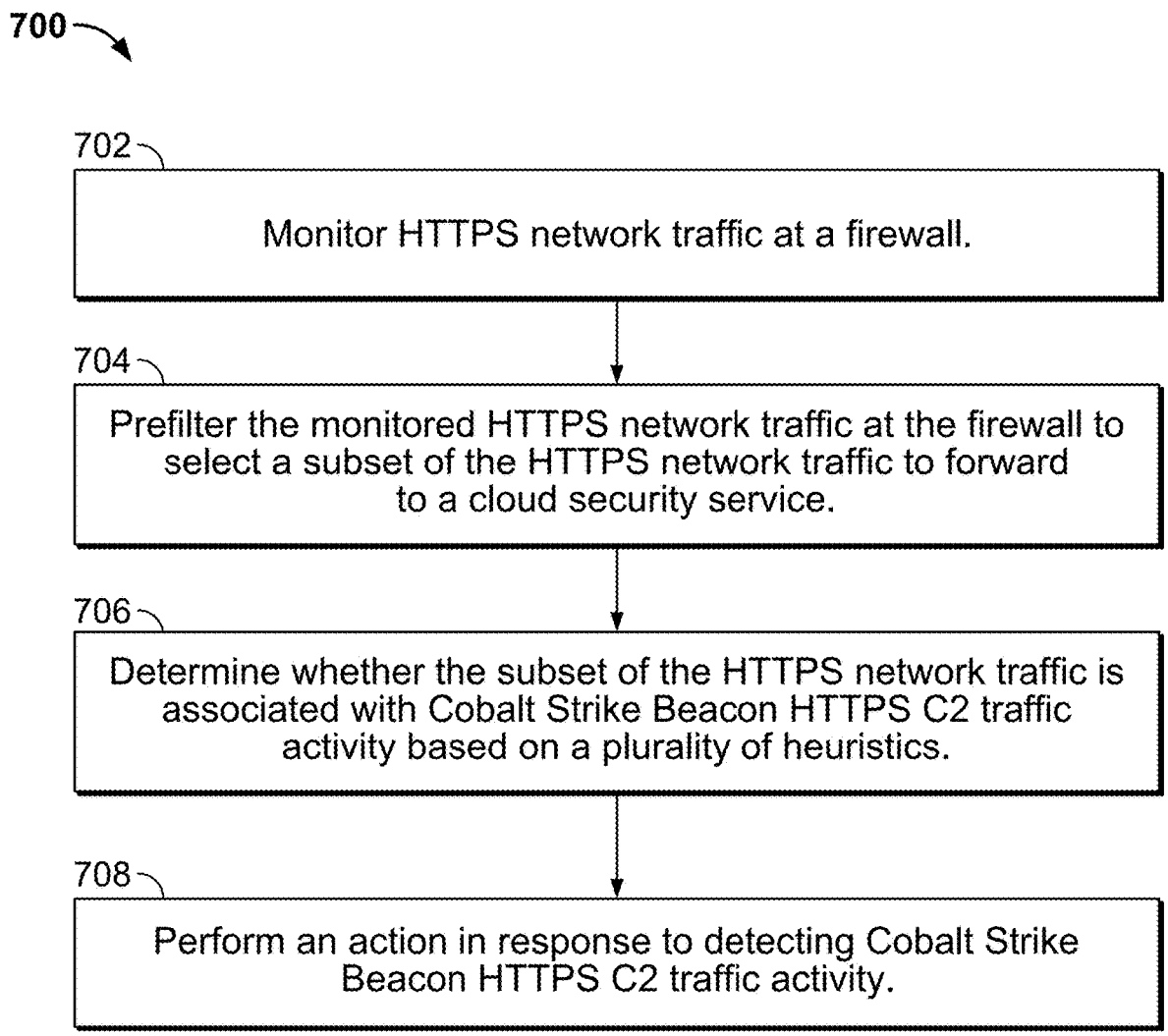
FIG. 7 is a flow diagram of a process for Cobalt Strike Beacon HTTPS C2 heuristic detection in accordance with some embodiments.

FIG. 7 is a flow diagram of a process for Cobalt Strike Beacon HTTPS C2 heuristic detection in accordance with some embodiments. In some embodiments, a process 700 as shown in FIG. 7 is performed by the security platform and techniques as similarly described above including the embodiments described above with respect to FIGS. 1-5G. In one embodiment, process 700 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 702, HTTPS network traffic is monitored at a firewall. For example, the firewall can utilize an application identification to detect HTTPS traffic, such as similarly described above with respect to FIGS. 1 and 4B.

At 704, prefiltering of the monitored HTTPS network traffic is performed at the firewall to select a subset of the HTTPS network traffic to forward to a cloud security service. For example, an HTTPS prefiltering module can perform heuristic analysis of the HTTPS network traffic to select a subset of HTTPS traffic sessions to forward to the cloud security service for further analysis, such as similarly described above with respect to FIGS. 4B and 5E-5G.

At 706, determining whether the subset of the HTTPS network traffic is associated with Cobalt Strike Beacon HTTPS C2 traffic activity based on a plurality of heuristics is performed. For example, an HTTPS logic check module can perform further heuristic analysis of the HTTPS network traffic to automatically detect Cobalt Strike Beacon HTTPS C2 traffic, such as similarly described above with respect to FIGS. 4B and 5E-5G.

At 708, an action is performed in response to detecting Cobalt Strike Beacon HTTPS C2 traffic activity. The security platform (122) and/or data appliance (102) can then perform an action based on a policy (e.g., security/C2 related malware policy, which can be stored in policies 252 as shown in FIG. 2B) in response to the malware verdict. For example, the data appliance can be configured to block the Cobalt Strike Beacon HTTPS C2 traffic activity. Other example actions can include blocking access to the destination IP address associated with the detected Cobalt Strike Beacon HTTPS C2 traffic activity, blocking/dropping the network traffic associated with the detected Cobalt Strike Beacon HTTPS C2 traffic activity and/or associated with that destination IP address, alerting an endpoint user and/or a network/security administrator that the endpoint was associated with the detected Cobalt Strike Beacon HTTPS C2 traffic activity, quarantining an endpoint device associated with the detected Cobalt Strike Beacon HTTPS C2 traffic activity, identifying the destination IP address, URL, etc. associated with the detected Cobalt Strike Beacon HTTPS C2 traffic activity as malicious (or potentially malicious), and/or various other actions can also be performed based on the policy.

Probing for Cobalt Strike TeamServer Detection

Another technical challenge is to verify that a target IP address (e.g., extracted based on the above-described techniques) is hosting a Cobalt Strike TeamServer.

Accordingly, various techniques for probing (e.g., active probing) for Cobalt Strike TeamServer detection are disclosed. For example, the disclosed techniques utilize active probing of an IP address to detect whether the IP address is hosting a Cobalt Strike TeamServer based on responses to the active probing (e.g., packets sent in response from the target IP address to probe packets).

As similarly described above with respect to FIGS. 4A and 4B, a destination IP probing and validation component/module of quality check system 404 performs active probing (e.g., over HTTP or HTTPS) of an IP address to detect whether the IP address is hosting a Cobalt Strike TeamServer based on responses (e.g., packets sent in response from the target IP address to probe packets) to the active probing. As will be further described below, the disclosed active probing techniques for Cobalt Strike TeamServer detection can be performed using various network protocols, including, for example, HTTP, HTTPS, and/or DNS.

Generally, the destination IP probing and validation module extract the destination (dst) IP address (dst IP) and port number (port) information from the network traffic that was forwarded/collected from a firewall that monitors network traffic, as similarly described above with respect to FIGS. 4A and 4B. Next, the destination IP probing and validation module sends a crafted request (e.g., a crafted HTTP/HTTPS/DNS request) to the dst IP and port (e.g., the target). The destination IP probing and validation module then checks/evaluates the response(s) received from the target. If the response content matches with a predetermined fingerprint and detection logic, then the dst IP, port, and a malicious verdict is inserted into the fast match table (e.g., the fast match table of detection system 402 as similarly described above with respect to FIGS. 4A and 4B). Otherwise (i.e., there was not a match with the predetermined fingerprint and detection logic), then the dst IP, port, and a benign verdict is inserted into the fast match table.

HTTP/HTTPS Probing for Cobalt Strike TeamServer Detection

An example implementation for HTTP/HTTPS active probing for Cobalt Strike TeamServer detection will now be described. As an initial precheck operation of the probing logic, the destination IP probing and validation module sends a crafted precheck HTTP/HTTPS request to the dst IP and port (e.g., the target). The example crafted precheck HTTP/HTTPS request is as follows: http[s]://[IP]:[Port]/index.html. The destination IP probing and validation module then checks/evaluates the response to the crafted precheck HTTP/HTTPS request. Specifically, if the following is received in the response from the target, then it is deemed suspicious (e.g., may (likely) be a Cobalt Strike TeamServer) and further active probing and evaluation will be performed. More specifically, if the response includes a status code equals 404 and the HTTP/HTTPS header includes the following fields and values: 'Date' and date value (e.g., 'Wed, 9 Feb. 2022 23:09:48 GMT'); 'Content-Type': 'text/plain'; and 'Content-Length': '0'. Otherwise (e.g., these fields and values are not present in the response from the target), then it is determined that the target is not a Cobalt Strike TeamServer and further active probing and evaluation will not be performed and the verdict will be determined to be benign (and the fast match table can be updated as similarly described above with respect to FIGS. 4A and 4B).

As a final precheck operation of the HTTP/HTTPS probing logic, the destination IP probing and validation module sends a crafted HTTP/HTTPS request to the target to download the beacon file. The example crafted final precheck HTTP/HTTPS request includes a URL value of "Swb1" and is as follows: http[s]://[IP]:[Port]/Swb1. In this example, "Swb1" can be any 4 bytes that satisfies the following checksum requirements: 4-bytes URL checksum value equals 92 or 93 based on the platform, such as using the checksum algorithm as shown in FIG. 8 in which the input string text is the 4-bytes URL value. FIG. 8 illustrates a checksum algorithm for probing logic for HTTP/HTTPS Cobalt Strike TeamServer detection in accordance with some embodiments. The destination IP probing and validation module then checks/evaluates the response to the crafted final check HTTP/HTTPS request. If the target is a Cobalt Strike TeamServer, then the response from the target will return a status code equals 200, the HTTP/HTTPS header 'Content-Length' value is greater than 200 k and less than 300 k, and the HTTP/HTTPS body first 2 bytes equals 0xFC48 or 0xFCe8 (e.g., as such is present in the Cobalt Strike shared code for the beacon file based on heuristics analysis of Cobalt Strike TeamServer behavior and the content of its beacon file). Otherwise (e.g., the response does not match the above-described criteria), and as a result, it is determined that the target is not a Cobalt Strike TeamServer and further active probing and evaluation will not be performed and the verdict will be determined to be benign (and the fast match table can be updated as similarly described above with respect to FIGS. 4A and 4B).

DNS Probing for Cobalt Strike TeamServer Detection

Figure 9A:
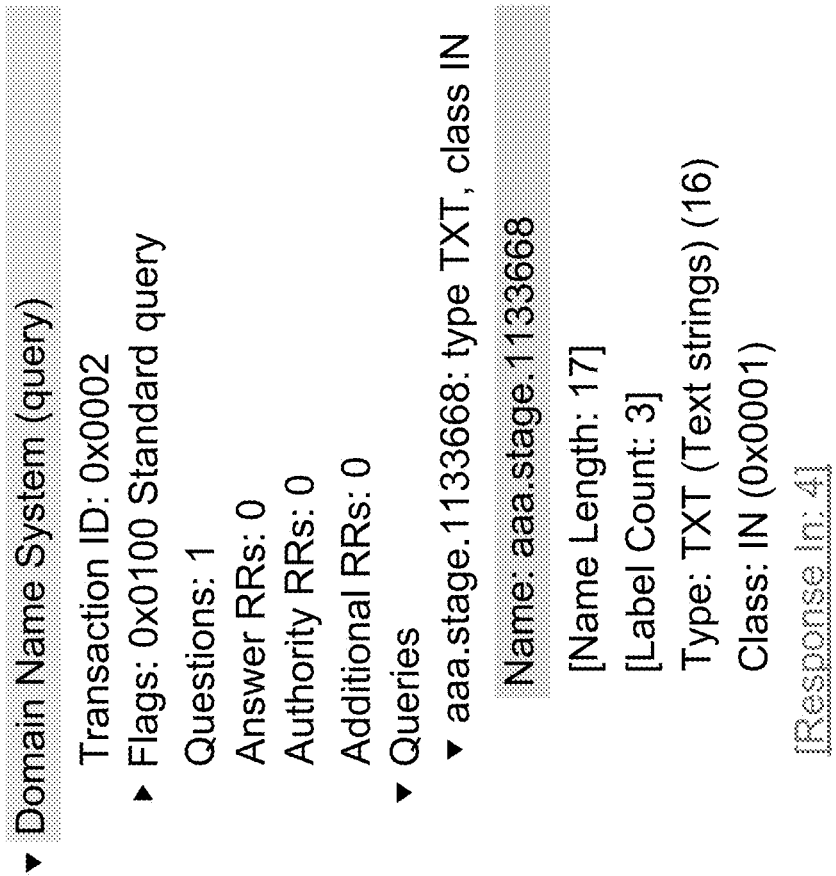
FIG. 9A illustrates an example DNS request for performing active probing of a target in accordance with some embodiments.

An example implementation for DNS active probing for Cobalt Strike TeamServer detection will now be described. As an initial precheck operation of the probing logic, the destination IP probing and validation module performs a final check for the DNS probing of the dst IP and port (e.g., the target). As a final precheck operation of the DNS probing logic, the destination IP probing and validation module sends a crafted DNS request to the target to download the beacon file. FIG. 9A illustrates an example DNS request for performing active probing of a target in accordance with some embodiments. Specifically, a crafted DNS request is sent to the target to download the beacon file. More specifically, the crafted DNS request is a txt DNS request with domain aaa.stage.xxxx as shown in FIG. 9A.

The destination IP probing and validation module then checks the content of the DNS response from the target. If the target is a Cobalt Strike TeamServer, then the response from the target will return a txt DNS record response with content that begins with "WYIIIIIIIIIII" (e.g., as such is present in the Cobalt Strike base64 encoding for the shared code for the beacon file based on heuristics analysis of Cobalt Strike TeamServer behavior and the content of its beacon file), such as shown in FIG. 9B. FIG. 9B illustrates an example DNS response to active probing of a target in accordance with some embodiments. Otherwise (e.g., the response does not match the above-described criteria), and as a result, it is determined that the target is not a Cobalt Strike TeamServer and further active probing and evaluation will not be performed and the verdict will be determined to be benign (and the fast match table can be updated as similarly described above with respect to FIGS. 4A and 4B).

Additional example processes for the disclosed techniques for probing for Cobalt Strike TeamServer detection will now be described.

Example Processes for HTTP/HTTPS Probing for Cobalt Strike TeamServer Detection

Figure 10:
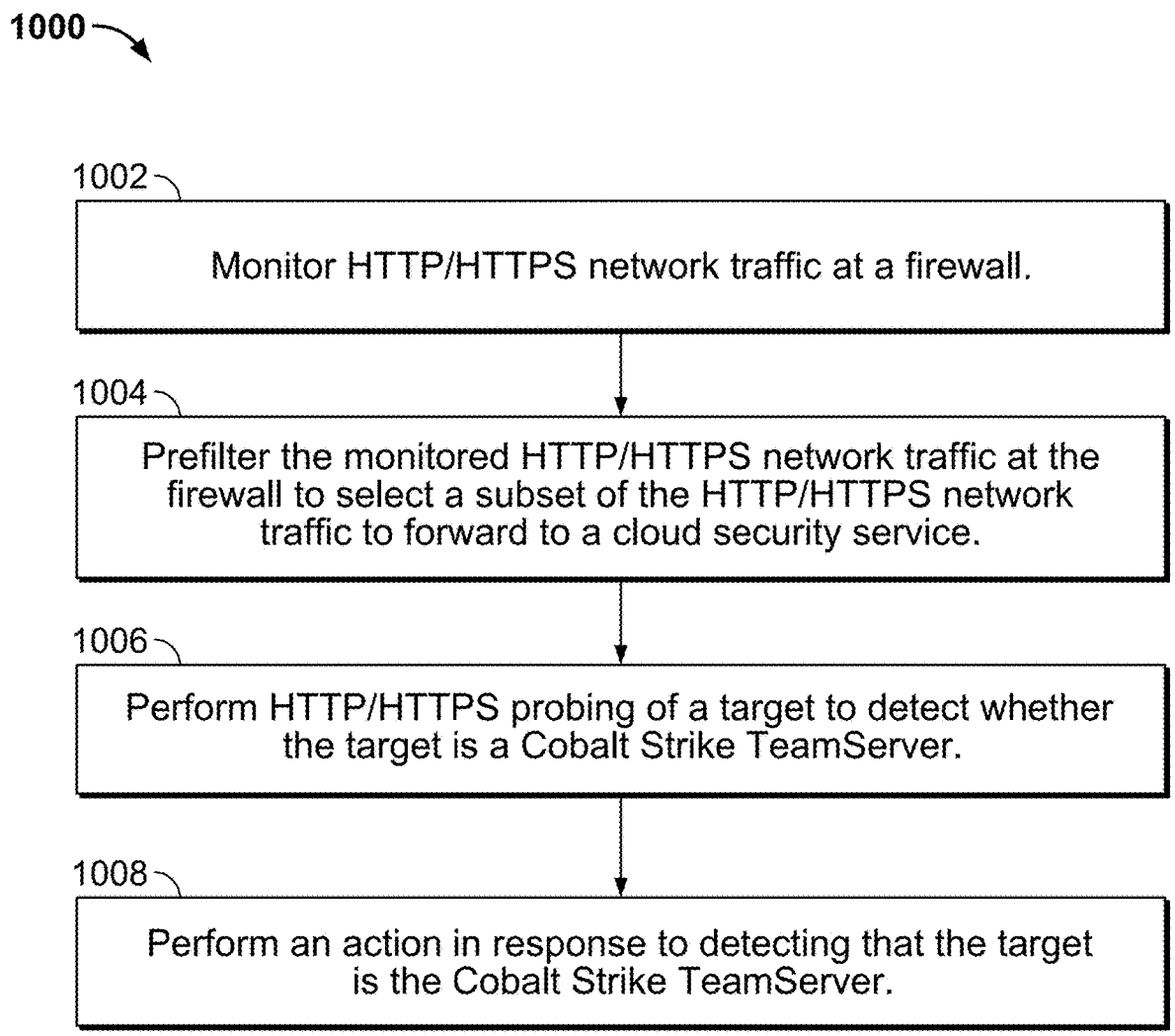
FIG. 10 is a flow diagram of a process for HTTP/HTTPS probing for Cobalt Strike TeamServer detection in accordance with some embodiments.

FIG. 10 is a flow diagram of a process for HTTP/HTTPS probing for Cobalt Strike TeamServer detection in accordance with some embodiments. In some embodiments, a process 1000 as shown in FIG. 10 is performed by the security platform and techniques as similarly described above including the embodiments described above with respect to FIGS. 1-8. In one embodiment, process 1000 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 1002, HTTP/HTTPS network traffic is monitored at a firewall. For example, the firewall can utilize an application identification to detect HTTP/HTTPS traffic, such as similarly described above with respect to FIGS. 1 and 4A-4B.

At 1004, prefiltering of the monitored HTTP/HTTPS network traffic is performed at the firewall to select a subset of the HTTP/HTTPS network traffic to forward to a cloud security service. For example, an HTTP/HTTPS prefiltering module can perform heuristic analysis of the HTTP/HTTPS network traffic to select a subset of HTTP/HTTPS traffic sessions to forward to the cloud security service for further analysis, such as similarly described above with respect to FIGS. 4A-4B and 5A-5G.

At 1006, HTTP/HTTPS probing of a target to detect whether the target is a Cobalt Strike TeamServer is performed. For example, a destination IP probing and validation module can perform further heuristic analysis of the responses from the target to automatically detect a Cobalt Strike TeamServer, such as similarly described above with respect to FIGS. 4A-4B, 5A-5G and 8.

At 1008, an action is performed in response to detecting that the target is the Cobalt Strike TeamServer. The security platform (122) and/or data appliance (102) can then perform an action based on a policy (e.g., security/C2 related malware policy, which can be stored in policies 252 as shown in FIG. 2B) in response to the malware verdict. For example, the data appliance can be configured to block the Cobalt Strike Beacon HTTP/HTTPS C2 traffic activity. Other example actions can include blocking access to the destination IP address associated with the detected Cobalt Strike Beacon HTTP/HTTPS C2 traffic activity, blocking/dropping the network traffic associated with the detected Cobalt Strike Beacon HTTP/HTTPS C2 traffic activity and/or associated with that destination IP address, alerting an endpoint user and/or a network/security administrator that the endpoint was associated with the detected Cobalt Strike Beacon HTTP/HTTPS C2 traffic activity, quarantining an endpoint device associated with the detected Cobalt Strike Beacon HTTP/HTTPS C2 traffic activity, identifying the destination IP address, URL, etc. associated with the detected Cobalt Strike Beacon HTTP/HTTPS C2 traffic activity as malicious (or potentially malicious), and/or various other actions can also be performed based on the policy.

Example Processes for DNS Probing for Cobalt Strike TeamServer Detection

Figure 11:
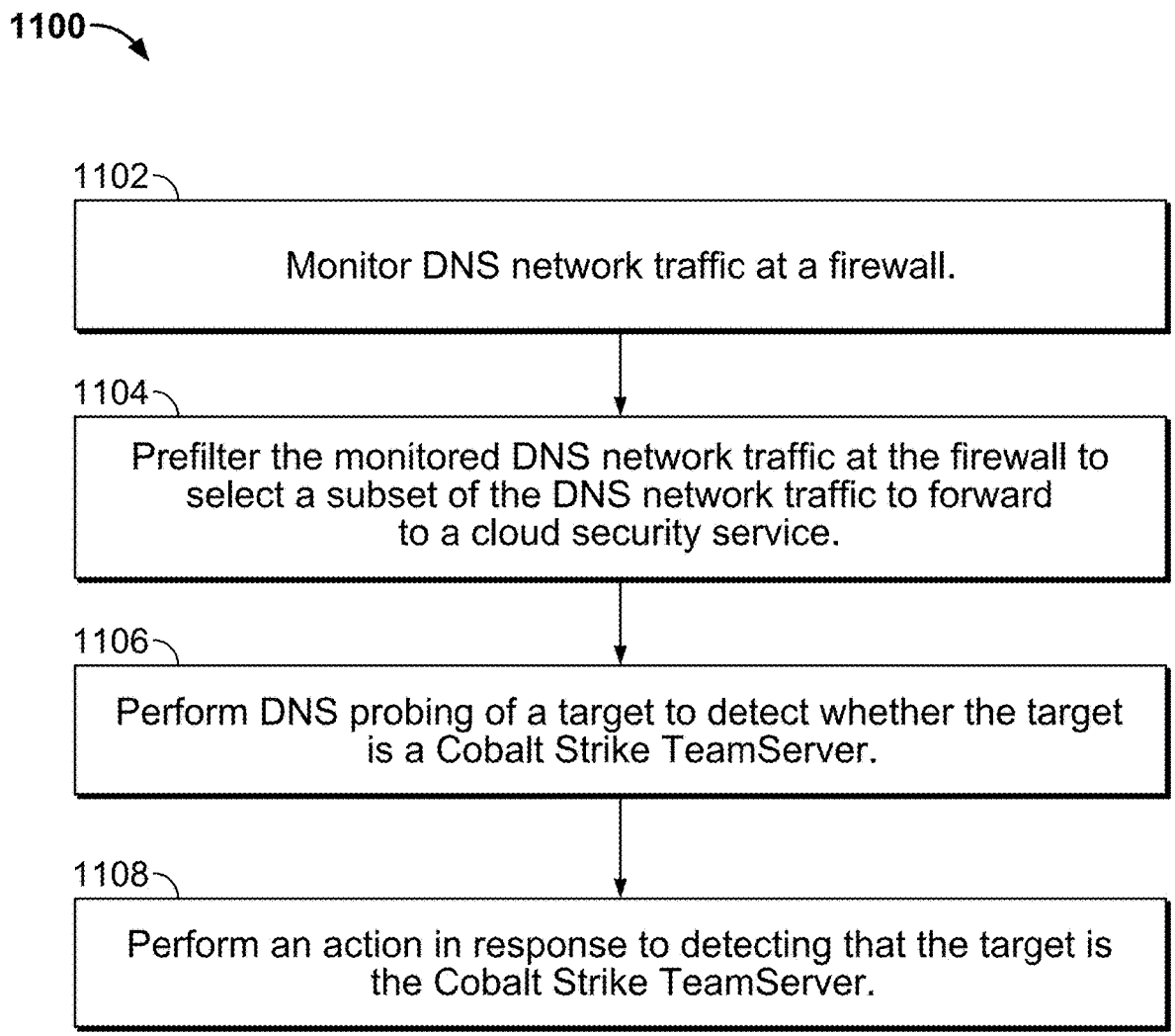
FIG. 11 is a flow diagram of a process for DNS probing for Cobalt Strike TeamServer detection in accordance with some embodiments.

FIG. 11 is a flow diagram of a process for DNS probing for Cobalt Strike TeamServer detection in accordance with some embodiments. In some embodiments, a process 1100 as shown in FIG. 11 is performed by the security platform and techniques as similarly described above including the embodiments described above with respect to FIGS. 1-7 and 9A-B. In one embodiment, process 1100 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 1102, DNS network traffic is monitored at a firewall. For example, the firewall can utilize an application identification to detect DNS traffic, such as similarly described above with respect to FIGS. 1 and 4A-4B.

At 1104, prefiltering of the monitored DNS network traffic is performed at the firewall to select a subset of the DNS network traffic to forward to a cloud security service. For example, an DNS prefiltering module can perform heuristic analysis of the DNS network traffic to select a subset of DNS traffic sessions to forward to the cloud security service for further analysis, such as similarly described above with respect to FIGS. 4A-4B and 5A-5G and further described below.

In an example implementation of a DNS prefiltering operation such as similarly shown at 410 in FIG. 4A can be performed by a DNS prefilter module implemented on firewall 102 by performing the following heuristic analysis: if the DNS request is a DNS txt record (e.g., dns.qry.type==16(txt record)), then the traffic is forwarded to the cloud for further Cobalt Strike detection analysis.

At 1106, DNS probing of a target to detect whether the target is a Cobalt Strike TeamServer is performed. For example, a destination IP probing and validation module can perform further heuristic analysis of the responses from the target to automatically detect a Cobalt Strike TeamServer, such as similarly described above with respect to FIGS. 4A-4B, 5A-5G, and 9A-9B.

At 1108, an action is performed in response to detecting that the target is the Cobalt Strike TeamServer. The security platform (122) and/or data appliance (102) can then perform an action based on a policy (e.g., security/C2 related malware policy, which can be stored in policies 252 as shown in FIG. 2B) in response to the malware verdict. For example, the data appliance can be configured to block the Cobalt Strike Beacon DNS C2 traffic activity. Other example actions can include blocking access to the destination IP address associated with the detected Cobalt Strike Beacon DNS C2 traffic activity, blocking/dropping the network traffic associated with the detected Cobalt Strike Beacon DNS C2 traffic activity and/or associated with that destination IP address, alerting an endpoint user and/or a network/security administrator that the endpoint was associated with the detected Cobalt Strike Beacon DNS C2 traffic activity, quarantining an endpoint device associated with the detected Cobalt Strike Beacon DNS C2 traffic activity, identifying the destination IP address, URL, etc. associated with the detected Cobalt Strike Beacon DNS C2 traffic activity as malicious (or potentially malicious), and/or various other actions can also be performed based on the policy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor HyperText Transfer Protocol Secure (HTTPS) network traffic at a firewall;
prefilter the monitored HTTPS network traffic at the firewall to select a subset of the HTTPS network traffic to forward to a cloud security service;
determine that the subset of the HTTPS network traffic is associated with Cobalt Strike Beacon HTTPS C2 traffic activity based on a plurality of heuristics, comprising to:
determine that a plurality of session timestamps associated with the subset of the HTTPS network traffic has a Gaussian distribution or a normal distribution, wherein the subset of the HTTPS network traffic includes a plurality of sessions, wherein the plurality of sessions includes a first session and a second session; and
in response to a determination that the plurality of session timestamps has the Gaussian distribution or the normal distribution:
determine that a timestamp gap between the first session and the second session is less than or equal to a predefined period of time; and
in response to a determination that the timestamp gap is less than or equal to the predefined period of time:
determine that a first hash value of a first header of the first session matches a second hash value of a second header of the second session; and
in response to a determination that the first hash value matches the second hash value:
determine that a number of fields in the first header is less than or equal to a predetermined threshold number of fields; and
in response to a determination that the number of fields in the first header is less than or equal to the predetermined threshold number of fields, determine that the subset of the HTTPS network traffic is associated with the Cobalt Strike Beacon HTTPS C2 traffic activity;
and
perform an action in response to detecting the Cobalt Strike Beacon HTTPS C2 traffic activity; and
a memory coupled to the processor and configured to provide the processor with instructions.

2. The system of claim 1, wherein a fast match table of a detection system stores previously detected Cobalt Strike Beacon HTTPS C2 traffic activity.

3. The system of claim 1, wherein a fast match table of a detection system stores a 3-tuple of previously detected Cobalt Strike Beacon HTTPS C2 traffic activity, wherein the 3-tuple includes a source IP address, a destination IP address, and a destination port.

4. The system of claim 1, wherein data statistics based on an automated heuristic analysis of the subset of the HTTPS network traffic is stored in a data statistics table of a detection system.

5. The system of claim 1, wherein the processor is further configured to perform a validation of the detected Cobalt Strike Beacon HTTPS C2 traffic activity.

6. The system of claim 1, wherein the processor is further configured to perform a validation of the detected Cobalt Strike Beacon HTTPS C2 traffic activity based on probing of a destination IP address associated with the detected Cobalt Strike Beacon HTTPS C2 traffic activity.

7. The system of claim 1, wherein the processor is further configured to perform a validation of the detected Cobalt Strike Beacon HTTPS C2 traffic activity based on probing of a destination IP address associated with the detected Cobalt Strike Beacon HTTPS C2 traffic activity and using a fingerprint data store.

8. A method, comprising:
monitoring HyperText Transfer Protocol Secure (HTTPS) network traffic at a firewall;
prefiltering the monitored HTTPS network traffic at the firewall to select a subset of the HTTPS network traffic to forward to a cloud security service;
determining that the subset of the HTTPS network traffic is associated with Cobalt Strike Beacon HTTPS C2 traffic activity based on a plurality of heuristics, comprising:
determining that a plurality of session timestamps associated with the subset of the HTTPS network traffic has a Gaussian distribution or a normal distribution, wherein the subset of the HTTPS network traffic includes a plurality of sessions, wherein the plurality of sessions includes a first session and a second session; and
in response to a determination that the plurality of session timestamps has the Gaussian distribution or the normal distribution:
determining that a timestamp gap between the first session and the second session is less than or equal to a predefined period of time; and
in response to a determination that the timestamp gap is less than or equal to the predefined period of time:
determining that a first hash value of a first header of the first session matches a second hash value of a second header of the second session; and
in response to a determination that the first hash value matches the second hash value:
determining that a number of fields in the first header is less than or equal to a predetermined threshold number of fields; and
in response to a determination that the number of fields in the first header is less than or equal to the predetermined threshold number of fields, determining that the subset of the HTTPS network traffic is associated with the Cobalt Strike Beacon HTTPS C2 traffic activity;
and
performing an action in response to detecting the Cobalt Strike Beacon HTTPS C2 traffic activity.

9. The method of claim 8, wherein a fast match table of a detection system stores previously detected Cobalt Strike Beacon HTTPS C2 traffic activity.

10. The method of claim 8, wherein a fast match table of a detection system stores a 3-tuple of previously detected Cobalt Strike Beacon HTTPS C2 traffic activity, wherein the 3-tuple includes a source IP address, a destination IP address, and a destination port.

11. The method of claim 8, wherein data statistics based on an automated heuristic analysis of the subset of the HTTPS network traffic is stored in a data statistics table of a detection system.

12. The method of claim 8, further comprising performing a validation of the detected Cobalt Strike Beacon HTTPS C2 traffic activity.

13. The method of claim 8, further comprising performing a validation of the detected Cobalt Strike Beacon HTTPS C2 traffic activity based on probing of a destination IP address associated with the detected Cobalt Strike Beacon HTTPS C2 traffic activity.

14. The method of claim 8, further comprising performing a validation of the detected Cobalt Strike Beacon HTTPS C2 traffic activity based on probing of a destination IP address associated with the detected Cobalt Strike Beacon HTTPS C2 traffic activity and using a fingerprint data store.

15. A computer program product embodied in a non-transitory computer readable medium and comprising computer instructions for:

monitoring HyperText Transfer Protocol Secure (HTTPS) network traffic at a firewall;

prefiltering the monitored HTTPS network traffic at the firewall to select a subset of the HTTPS network traffic to forward to a cloud security service;

determining that the subset of the HTTPS network traffic is associated with Cobalt Strike Beacon HTTPS C2 traffic activity based on a plurality of heuristics, comprising:

determining that a plurality of session timestamps associated with the subset of the HTTPS network traffic has a Gaussian distribution or a normal distribution, wherein the subset of the HTTPS network traffic includes a plurality of sessions, wherein the plurality of sessions includes a first session and a second session; and in response to a determination that the plurality of session timestamps has the Gaussian distribution or the normal distribution:

determining that a timestamp gap between the first session and the second session is less than or equal to a predefined period of time; and in response to a determination that the timestamp gap is less than or equal to the predefined period of time:

determining that a first hash value of a first header of the first session matches a second hash value of a second header of the second session; and in response to a determination that the first hash value matches the second hash value:

determining that a number of fields in the first header is less than or equal to a predetermined threshold number of fields; and in response to a determination that the number of fields in the first header is less than or equal to the predetermined threshold number of fields, determining that the subset of the HTTPS network traffic is associated with the Cobalt Strike Beacon HTTPS C2 traffic activity;

and performing an action in response to detecting the Cobalt Strike Beacon HTTPS C2 traffic activity.

16. The computer program product of claim 15, wherein a fast match table of a detection system stores previously detected Cobalt Strike Beacon HTTPS C2 traffic activity.

17. The computer program product of claim 15, wherein a fast match table of a detection system stores a 3-tuple of previously detected Cobalt Strike Beacon HTTPS C2 traffic activity, wherein the 3-tuple includes a source IP address, a destination IP address, and a destination port.

18. The computer program product of claim 15, further comprising computer instructions for performing a validation of the detected Cobalt Strike Beacon HTTPS C2 traffic activity.

19. The computer program product of claim 15, further comprising computer instructions for performing a validation of the detected Cobalt Strike Beacon HTTPS C2 traffic activity based on probing of a destination IP address associated with the detected Cobalt Strike Beacon HTTPS C2 traffic activity.

20. The computer program product of claim 15, further comprising computer instructions for performing a validation of the detected Cobalt Strike Beacon HTTPS C2 traffic activity based on probing of a destination IP address associated with the detected Cobalt Strike Beacon HTTPS C2 traffic activity and using a fingerprint data store.

\* \* \* \* \*